United States Patent
Sales

(12) 
(10) Patent No.: US 6,700,702 B2
(45) Date of Patent: Mar. 2, 2004

(54) HIGH-CONTRAST SCREEN WITH RANDOM MICROLENS ARRAY

(75) Inventor: Tasso R. M. Sales, Rochester, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/072,014

(22) Filed: Feb. 7, 2002

(65) Prior Publication Data

US 2002/0145797 A1 Oct. 10, 2002

Related U.S. Application Data

(60) Provisional application No. 60/313,180, filed on Aug. 17, 2001, and provisional application No. 60/267,037, filed on Feb. 7, 2001.

(51) Int. Cl.[7] ............................................... G03B 21/56
(52) U.S. Cl. ........................................ 359/443; 359/455
(58) Field of Search ........................... 359/443, 455, 359/456, 460

(56) References Cited

U.S. PATENT DOCUMENTS

| | | |
|---|---|---|
| 1,942,841 A | 1/1934 | Shimizu |
| 2,338,654 A | 1/1944 | MacNeille |
| 2,358,070 A | 9/1944 | Holmes et al. |
| 2,362,573 A | 11/1944 | MacNeille |
| 2,618,198 A | 11/1952 | Luboshez |
| 2,804,801 A | 9/1957 | Mihalakis |
| 2,984,152 A | 5/1961 | Mihalakis |
| 3,063,339 A | 11/1962 | Mihalakis et al. |
| 3,832,032 A | 8/1974 | Shimada |
| 3,994,562 A | 11/1976 | Holzel |
| 4,003,080 A | 1/1977 | Maiman et al. |
| 4,076,384 A * | 2/1978 | Deml et al. ................. 359/456 |
| 4,172,219 A | 10/1979 | Deml et al. |
| 4,241,980 A | 12/1980 | Mihalakis, deceased et al. |
| 4,536,056 A | 8/1985 | Oguino |
| 4,556,626 A | 12/1985 | Speigel |
| 4,666,248 A | 5/1987 | van de Ven |
| 4,721,361 A | 1/1988 | van de Ven |

(List continued on next page.)

FOREIGN PATENT DOCUMENTS

| | | |
|---|---|---|
| EP | 0 753 791 A1 | 1/1997 |
| EP | 1 014 169 A1 | 6/2000 |
| EP | 1 074 882 A1 | 2/2001 |
| JP | 09-269546 | 10/1997 |
| JP | 11-101902 | 4/1999 |
| JP | 11-344602 | 12/1999 |
| JP | 2000-035616 | 2/2000 |
| JP | 2000-147662 | 5/2000 |
| JP | 2000-147663 | 5/2000 |
| JP | 2001-074918 | 3/2001 |
| WO | WO 99/36830 | 7/1999 |
| WO | WO 99/64929 | 12/1999 |
| WO | WO 00/67071 | 11/2000 |
| WO | WO 02/10804 | 2/2002 |

OTHER PUBLICATIONS

*Micro–Optics: Elements, systems and applications*, Hans P. Herzig, ed., Taylor & Francis, Bristol, PA, 1997, pp. 53–152.

Primary Examiner—Christopher Mahoney
(74) Attorney, Agent, or Firm—Maurice M. Klee; Ronald J. Paglierani

(57) ABSTRACT

Screens for use with image-forming illumination (53,54) are provided, as well as methods for producing such screens. The screens include an array of lenses (51), a substrate, and a layer of light-absorbing material (55) in which apertures are formed using aperture-forming illumination (52) which passes through the lenses (51). The optical properties of the lenses (51) and the thickness of the substrate are selected so as to maximize the light-blocking area of the layer of light-absorbing material (55) while allowing long-wavelength image-forming illumination (54) to pass through the apertures substantially unimpeded. The array of lenses can be an array of randomized, anamorphic microlenses.

53 Claims, 40 Drawing Sheets

U.S. PATENT DOCUMENTS

| | | |
|---|---|---|
| 4,882,262 A | 11/1989 | Wilwerding |
| 5,066,099 A | 11/1991 | Yoshida et al. |
| 5,085,977 A | 2/1992 | Sugawara et al. |
| 5,119,235 A | 6/1992 | Umeda et al. |
| 5,177,637 A | 1/1993 | Tsukada |
| 5,475,533 A * | 12/1995 | Steenblik et al. ........... 359/455 |
| 5,536,455 A | 7/1996 | Aoyama et al. |
| 5,733,710 A | 3/1998 | Kuboya et al. |
| 5,870,224 A | 2/1999 | Saitoh et al. |
| 5,897,980 A | 4/1999 | Phillips et al. |
| 6,034,817 A | 3/2000 | Mihalakis |
| 6,317,263 B1 * | 11/2001 | Moshrefzadeh et al. .... 359/443 |
| 6,335,828 B1 * | 1/2002 | Hashimoto et al. ......... 359/443 |
| 2001/0015780 A1 | 8/2001 | Yamaguchi |

* cited by examiner

Target thickness for substrate: 75 microns
Total depth of microlens array: 20 microns Target thickness for substrate: 75 microns
Total depth of microlens array: 30 microns Target thickness for substrate: 125 microns
Total depth of microlens array: 20 microns Prior Art

HIGH-CONTRAST SCREEN WITH RANDOM MICROLENS ARRAY

FIELD OF THE INVENTION

The present invention relates to a screen apparatus that includes a microlens array and provides high transmission and high image contrast, as well as rejection of ambient light. The three fundamental components of the screen constitute a microlens array, e.g., a random microlens array, a substrate that supports the array, and a layer of light-absorbing material. The substrate and the microlens array can be separate components or a single unitary component.

The microlens array is preferably composed of generally anamorphic lens units that scatter and shape light according to distinct divergence angles along perpendicular directions. The use of random microlens units is also preferred since it eliminates the occurrence of image artifacts such as aliasing or moiré patterns. In addition, the size of each microlens unit in the array is preferably chosen small enough to provide high resolution. A typical microlens diameter or, more generally, maximum transverse dimension is between 20 and 120 microns.

The substrate, generally of a plastic material, provides support and mechanical rigidity to the whole screen. In the formation of the screen, an absorptive layer is added to the substrate, opposite to the microlens side, to provide ambient-light rejection and improve image contrast. Initially the light-absorbing material is added as a film layer, which is later exposed with aperture-forming illumination, e.g., ultraviolet illumination, to create apertures through which light propagates. The microlens array itself serves as the focusing element that creates the apertures.

A major contribution to the art of the present invention relates to the design of the microlens units to attain efficient focusing of the aperture-forming illumination throughout the array. Each lens element in the array is thus optimized to present a focus plane close to the absorptive layer so as to maximize the density of absorptive material while allowing the image-forming illumination to reach the viewer substantially unimpeded. The present invention can be used for general screen applications such as in rear-view projection televisions, computer screens, and general-purpose displays, among other devices.

BACKGROUND OF THE INVENTION

Display devices consist, in a broad sense, of an illumination system that provides luminous power (the light engine), relay optics such as lenses and mirrors, and a screen that projects information through images to the viewer in the so-called viewing space. The present invention relates to the screen component of display devices.

Desirable optical qualities for screens include high transmission, high contrast, rejection of ambient light, absence of image artifacts, high gain, and wide viewing angles. The basic elements of the screen responsible for these optical properties include a diffusing component, a supporting substrate, and an absorptive material. The diffusing component spreads the illumination in a controlled manner to direct the visual information to locations most likely occupied by the viewer. The absorptive material minimizes reflection of ambient light that reduces image contrast. Important examples of display devices include liquid crystal projection TV's; CRT projectors that use three distinct color sources in the light engine; flat-panel computer displays; and hand-held computing devices.

As the demand for high-quality displays increases, so does the necessity for adequate screen designs. For instance, the advent of HDTV (high-definition television) requires a considerable increase in image resolution, which implies that the screen must be able to resolve very fine features in the images being projected. To minimize power consumption and maximize brightness the screen must transmit a high fraction of the luminous power generated by the light engine. It is desirable that the transmission efficiency exceed 80%. On the other hand, to provide image contrast, the screen requires some sort of absorptive material that helps reject ambient light. If not properly designed, this absorptive material may lead to a significant decrease in transmission efficiency.

The diffusing component of screens used in virtually all commercial display systems to date rely on the use of lenticular arrays and/or random Gaussian surface diffusers. The lenticular arrays consist of cylindrical lenses with pitch between 300 microns and up to 700 microns. An example of this type of screen can be found in U.S. Pat. No. 5,870,224. More recently, improved lenticular screens with pitch down to 150 microns have been used. Because cylindrical lenses diffuse the illumination in a single direction (usually the horizontal) it must be combined with another diffusing component in the perpendicular direction, generally a random surface diffuser, if some wider viewing range is desired in the perpendicular direction.

The lenticular array and random Gaussian surface diffusers, while commercially available, present inherent disadvantages as follows. The lenticular array, because of its periodicity, may lead to diffraction effects as well as moiré fringing effects. Furthermore, lenticular arrays provide limited control over the distribution and shaping of light in the viewer space. Gaussian surface diffusers have the serious disadvantage of introducing speckle, which adds a grainy appearance to the image, unacceptable to the viewer. Also, Gaussian diffusers offer limited control over the scattering pattern. U.S. Pat. No. 4,666,248 discloses a screen geometry based on the use of a regular array of anamorphic lenses, in an attempt to obtain more control over the scattering profile. The regular nature of the array, however, does not avoid problems with diffraction and moiré fringing effects. Furthermore, the size of each microlens unit is between 300 and 500 microns, offering insufficient resolution for the increasingly high demands of visual display systems.

To provide a screen with ambient-light rejection capabilities and improved contrast it is necessary to introduce a light-absorbing component to the screen. A great majority of screens in commercial use add a bulk absorbing material (tint) to the body of the screen that, while adding contrast to it, also consumes a considerable fraction of the useful illumination originating in the light engine. In fact, transmission efficiency is typically below 60% and in many cases even less.

A more attractive approach relies on adding a layer of light-absorbing material to a screen that has focusing elements and has the absorbing material perforated in such a way that light is focused through the apertures, as illustrated in FIG. 1. This is the approach described in U.S. Pat. Nos. 5,870,224; 4,666,248; 5,066,099; and 4,721,361. The main advantage of this scheme is that high transmission may be maintained even if the screen presents a high density of light-absorbing material.

Although this approach seems promising, there are some known difficulties such as quality of the apertures, mask alignment for aperture formation, and uniformity of the dark absorptive material. Also, the focusing array in the prior art has never been optimized to operate with the light-absorbing material, except for the use of a common focal distance for all focusing units. As a result, demonstration of the concept of a high-transmission screen through apertures perforated on a light-absorbing material has not been satisfactorily achieved by the prior art and is unavailable in current commercial display systems.

Some screens commercially available use focusing elements such as glass beads immersed on a light-absorbing material but this approach consumes a large fraction of the incident illumination and, therefore, cannot be considered satisfactory.

As a further aid in ambient-light rejection, U.S. Pat. Nos. 4,666,248 and 4,721,361 disclose a concept where a surface of the screen is structured with anti-reflection capabilities but this adds further complexity and may lead to image artifacts, unacceptable to the viewer. Furthermore, if the density of light-absorbing material in the screen is high, such as above 70%, there is little need for the further complication caused by an anti-reflection structured surface.

In contrast to the foregoing, the present invention is geared towards high density of light-absorbing material and thus allows a simpler screen architecture.

SUMMARY OF THE INVENTION

The present invention addresses the drawbacks of the prior art, as described above, providing a novel and improved screen configuration that offers high transmission, high contrast, efficient ambient light rejection, high resolution, absence of image artifacts due to diffraction and moiré fringing, and widely controllable scattering angles to the viewer.

In accordance with one of its aspects, the invention provides a screen configuration comprising a diffusing element in the form of an array of microlenses which are preferably both random and generally anamorphic, a substrate, and a layer of light-absorbing material. In a first step, the microlens array, the substrate, and the layer of light-absorbing material are integrated in a single sheet. (As discussed above, the microlens array and the substrate can constitute a single unit if desired.) In a second step, the sheet is exposed to aperture-forming illumination, e.g., ultraviolet light, through the microlens array itself to create apertures in the light-absorbing material. There is no need to use external alignment masks and the initial self-alignment guarantees that light is efficiently transmitted through the apertures. The microlens array is especially designed such that the apertures created by the aperture-forming illumination preferably do not block any portion of the useful luminous energy from the light engine (the image-forming illumination). At the same time, the microlens array is especially designed to maximize the density of light-absorbing material remaining after the creation of the apertures. By apertures we mean either physical apertures (holes) or a transparent area in the light-absorbing material. The particular case depends on the interaction between the light-absorbing material and the aperture-forming illumination, e.g., the interaction can constitute ablation or a photo-chemical reaction.

In accordance with another aspect, the invention provides a random microlens array that focuses substantially all the aperture-forming incident light onto a light absorbing layer to create apertures through which image-forming illuminating radiation propagates. The light-absorbing material is located with respect to the microlens array so that the size of each aperture is minimized while at the same time allowing the screen to produce an acceptable image.

In accordance with a further aspect, the invention provides an array of anamorphic microlenses (preferably, a random array) such that light is focused at two distinct spatially-separated planes and creates distinct viewing angles away from the screen. Each microlens element is optimized so that the first focal plane away from the microlens array is substantially aimed at the light absorbing layer to create apertures through which image-forming illuminating radiation propagates. The light-absorbing material is located with respect to the microlens array so that the size of each aperture is minimized while at the same time allowing the screen to produce an acceptable image.

In accordance with a still further aspect, the invention provides an array of anamorphic microlenses (preferably, a random array) such that light is focused at two distinct spatially-separated planes and creates distinct viewing angles away from the screen. Each microlens element is optimized so that the second focal plane away from the microlens array is substantially aimed at the light absorbing layer to create apertures through which image-forming illuminating radiation propagates. The light-absorbing material is located with respect to the microlens array so that the size of each aperture is minimized while at the same time allowing the screen to produce an acceptable image.

In accordance with an additional aspect, the invention provides an array of anamorphic microlenses (preferably, a random array) where the diameter of each microlens unit is different along two perpendicular directions so that the spatially-separated focal points of the micro lenses are brought closer together, while maintaining distinct divergence angles for two perpendicular directions. The light-absorbing material is located with respect to the micro lens array so that the size of each aperture is minimized while at the same time allowing the screen to produce an acceptable image.

The invention also provides a method that allows the depth of the microlens array and the thickness of the substrate to be chosen arbitrarily and independently of each other in the case where the desired divergence angles differ along two perpendicular directions.

In a realization (embodiment) of the invention, the microlens units in the array are arranged in a close-packed square array.

In a realization (embodiment) of the invention, the microlens units in the array are arranged in a close-packed rectangular array.

In a further realization (embodiment) of the invention, the microlens units in the array are arranged in a close-packed hexagonal array.

In another realization (embodiment) of the invention, the microlens units in the array have spherical boundaries and are arranged in a hexagonal array.

In a further realization (embodiment) of the invention, the spatial arrangement of the microlenses is random with each microlens unit defined by general polygonal boundaries.

According to a realization (embodiment) of the invention, the apertures formed in the light-absorbing material have the shape of horizontally-modulated lines.

In another realization (embodiment) of the invention, the apertures formed in the light-absorbing material have the shape of vertically-modulated lines.

According to a realization (embodiment) of the invention, the apertures formed in the light-absorbing material have the shape of horizontal ovals in a hexagonal spatial arrangement.

According to a realization (embodiment) of the invention, the apertures formed in the light-absorbing material have the shape of horizontal ovals in a square spatial arrangement.

According to a realization (embodiment) of the invention, the apertures formed in the light-absorbing material have the shape of vertical ovals in a hexagonal spatial arrangement.

According to a realization (embodiment) of the invention, the apertures formed in the light-absorbing material have the shape of vertical ovals in a square spatial arrangement.

According to a realization (embodiment) of the invention, the apertures formed in the light-absorbing material have the shape of horizontal ovals of varying size with a seemingly random spatial arrangement.

According to a realization (embodiment) of the invention, the apertures formed in the light-absorbing material have the shape of vertical ovals of varying size with a seemingly random spatial arrangement.

As used herein, the term "anamorphic" and the phrase "generally anamorphic" refers to a lens (e.g., a microlens) which has different optical powers along two orthogonal axes, the difference between the two powers being greater than 5 percent, i.e., $\Phi_1-\Phi_2/\Phi_1>0.05$ where $\Phi_1>\Phi_2$.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DETAILED DESCRIPTION OF THE PREFERRED EMBODIMENTS

We now describe in detail the implementation of the present invention in various representative embodiments.

Figure 1:
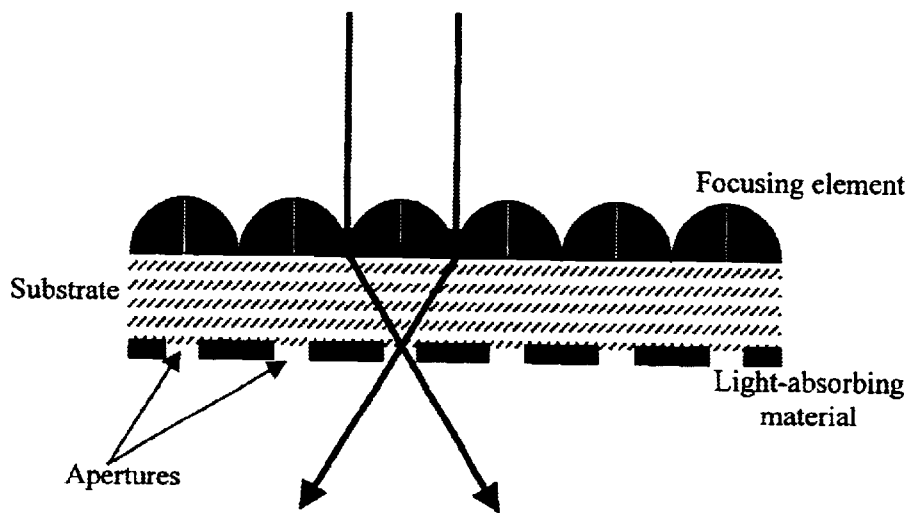
FIG. 1 shows illumination focused through a screen with perforated apertures in a light-absorbing material.
Figure 2:
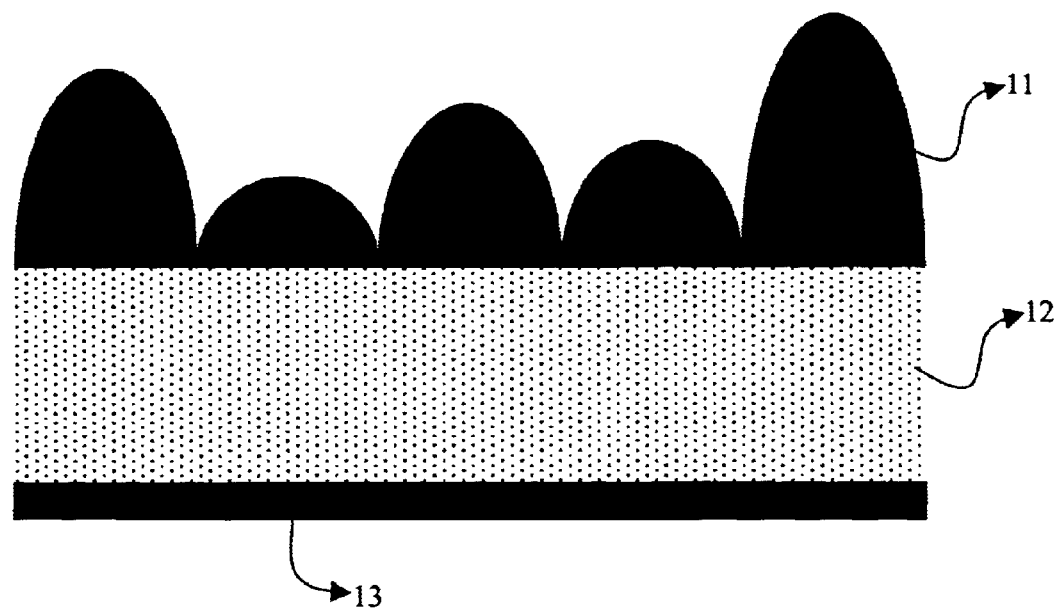
FIG. 2 shows the basic geometry of a screen (cross-section), according to the present invention.

The microlens array as described in the present invention is coupled to two basic additional elements that define the screen: the substrate and the light absorbing layer. These components are shown in FIG. 2. Actual fabrication of the screen may require the use of intermediary layers but the optical properties of the screen are fundamentally determined by the layers shown in FIG. 2: the microlens array 11, the substrate 12, and the light-absorbing material 13. Other components may be supplemented to the screen for additional mechanical rigidity or packaging. When these other components are used, they should be chosen so as not to affect the optical performance of the screen in any significant manner.

To implement the present invention, a knowledge of the following items is needed: (1) the spectrum of the exposing illumination that creates apertures in the light-absorbing material (aperture-forming spectrum); (2) the spectrum of the illumination that creates the images observed in the viewing space (image-forming spectrum); (3) indices of refraction of the microlens material over said spectra (aperture-forming and image-forming); (4) indices of refraction of the substrate over said spectra (aperture-forming and image-forming); (5) indices of any intermediary layers of materials between the light-absorbing material and the substrate over said spectra (aperture-forming and image-forming).

Figure 3:
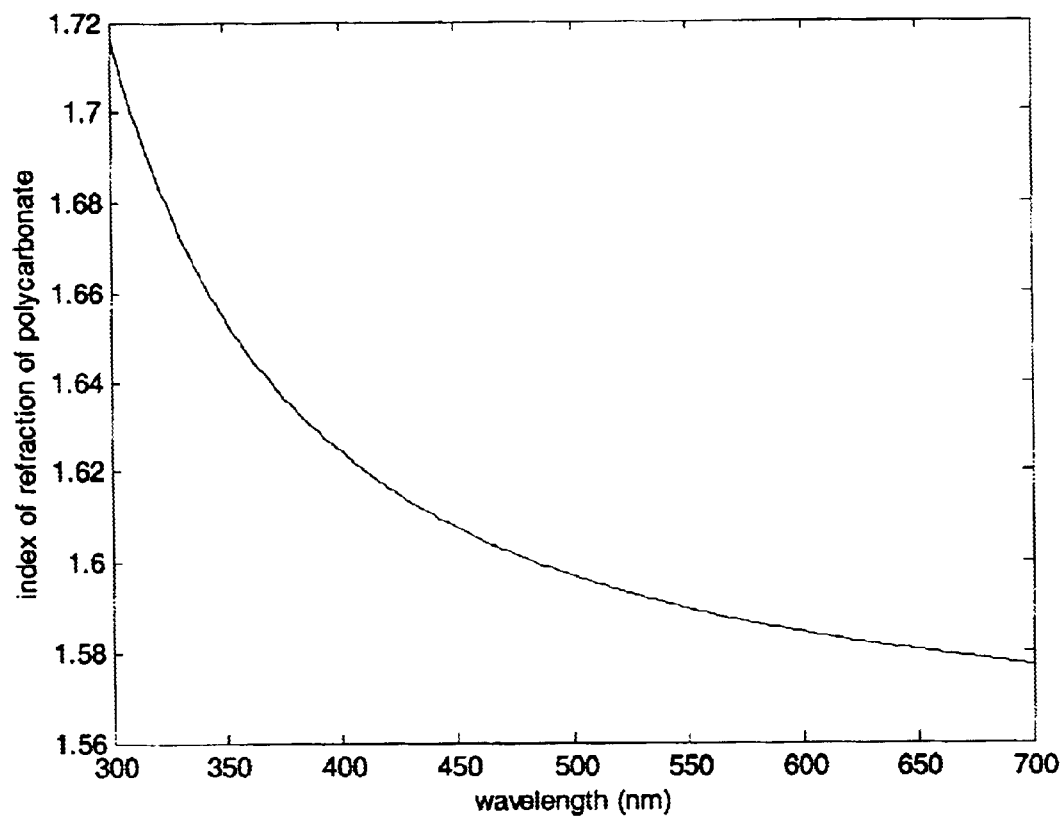
FIG. 3 shows the index of refraction of polycarbonate for illumination of wavelength between 300 nm and 700 nm.
Figure 4:
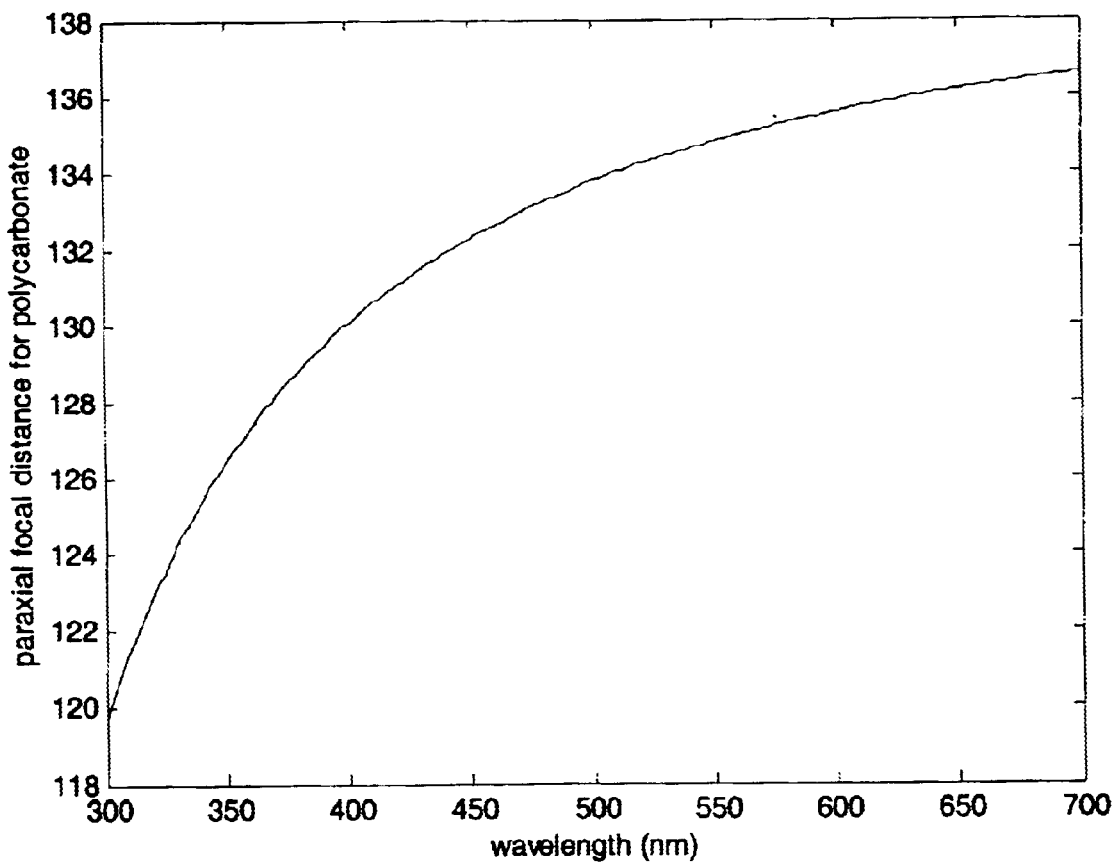
FIG. 4 shows the focal position for a polycarbonate microlens of radius 50 microns for illumination of wavelength between 300 nm and 700 nm

A first step of importance for the present invention is an understanding of the focusing properties of each microlens unit. Consider that the microlens array and the substrate are composed of the same type of material or two distinct materials with very similar indices of refraction. If this is the case, we say that the materials are optically equivalent. There is considerable advantage in using optically equivalent materials to avoid surface losses and to avoid changing the effective focusing power of the lenses. Assume, for instance, that the lenses and the substrate are composed of polycarbonate, a plastic material common in the production of screens. The variation of the index of refraction for polycarbonate is shown in FIG. 3 in the spectral range between 300 nm and 700 nm. As a consequence of this variation, the focal position also varies with wavelength. For example, if a spherical microlens has a radius of curvature R=50 $\mu$m, the focal distance into the polycarbonate material varies as shown in FIG. 4. Within a geometrical-optics, paraxial approximation, the focal position f($\lambda$) is given by $$f(\lambda) = \frac{n(\lambda)}{n(\lambda) - 1} R, \quad (1)$$

where n($\lambda$) is the index of the material at wavelength $\lambda$ and R is the radius of curvature of the microlens surface.

To provide maximum contrast and ambient light rejection, the density of light absorbing material must be maximized so that preferably 70% or more of the total surface is essentially absorbing. In this way, substantially most of the illumination incident on the screen from the viewer side is absorbed and does not return to the viewer thereby improving contrast and eliminating visual artifacts due to the ambient illumination. Consequently, if the density of light absorbing material is to be maximized, the apertures created by the aperture-forming illumination need to be as small as possible. On the other hand, the apertures cannot be so small that they block a portion of the light from the image-forming spectrum. The ideal situation is illustrated in FIG. 5.

In the initial stage of aperture-formation, the microlens array 51 is illuminated with the aperture-forming illumination, typically in the ultraviolet region of the spectrum such that $\lambda$<400 nm ($\lambda$ represents optical wavelength). The corresponding focal point 52 is formed closest to the microlens array. When projected to a viewer, the incident illumination is generally in the visible region of the spectrum, between 400 nm and 700 nm. The short wavelength in the image-forming spectrum has a focal point 53 closer to the microlens array while the long wavelength has a focal point 54 farther away. As FIG. 5 clearly indicates, careful positioning of the light-absorbing material 55 allows formation of apertures in a such a way that the cone of light associated with the longest wavelength in the image-forming spectrum is not blocked.

Figure 5:
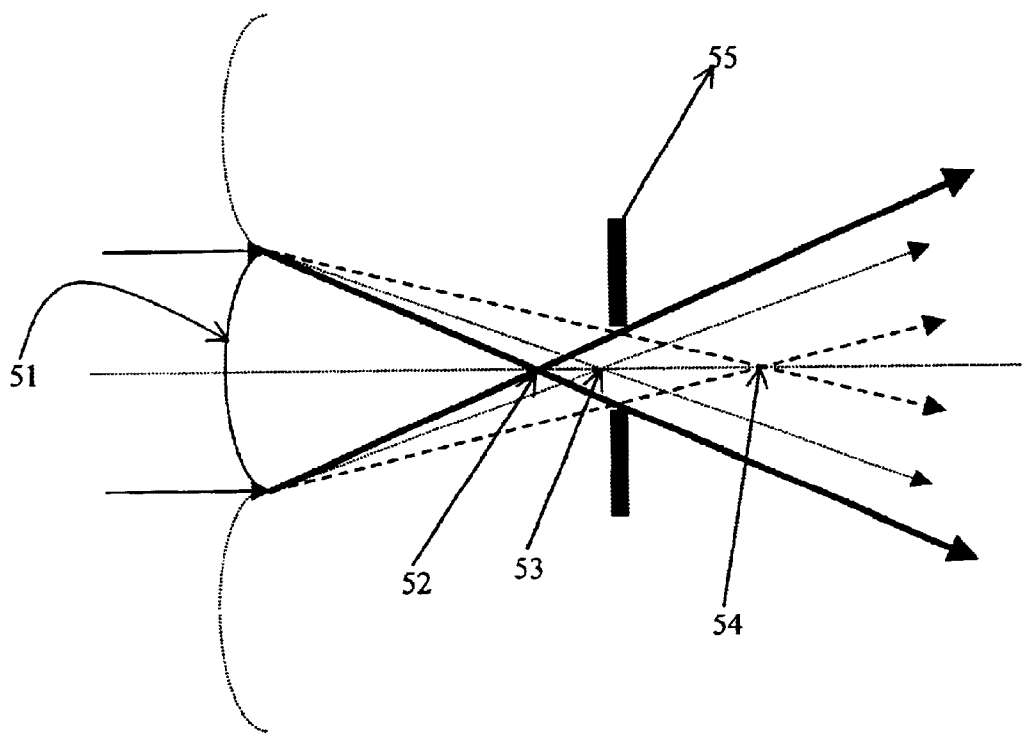
FIG. 5 shows an ideal focusing situation through the light-absorbing material.
Figure 6A:
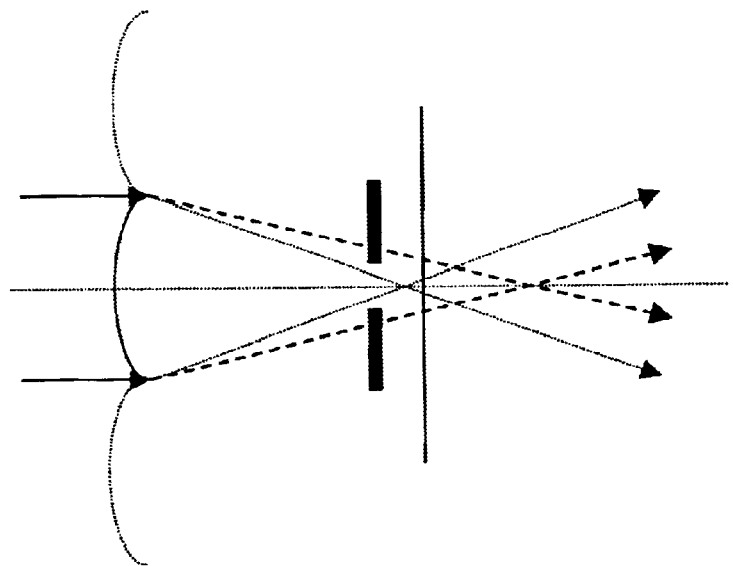
FIG. 6A and FIG. 6B show two undesirable focusing situations through the light-absorbing material.
Figure 6B:
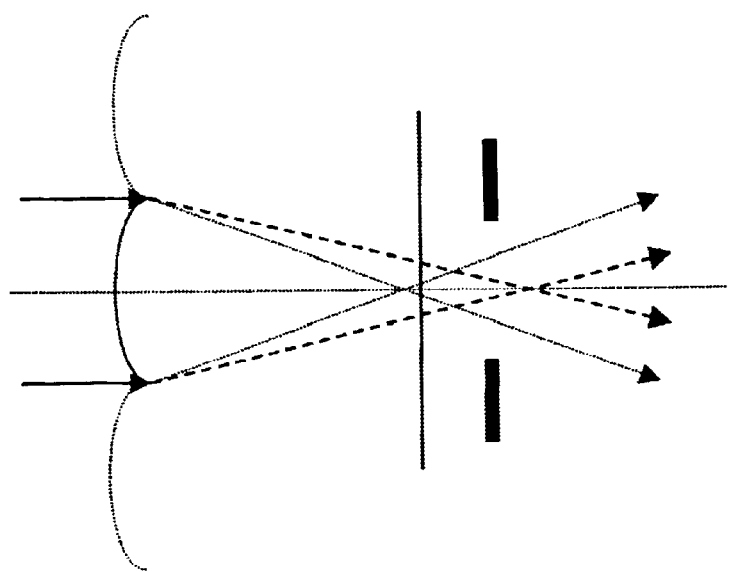

FIG. 5 thus shows the ideal position for the light-absorbing material 55 which, as shown, just allows the cone of light of the longest wavelength to pass through. Two undesirable circumstances are shown in FIGS. 6A and 6B. In FIG. 6A the substrate thickness is such that the light-absorbing material is close enough to the microlens array so that it blocks portions of the image-forming spectrum (the ideal position for the light-absorbing material is indicated by the vertical solid line). In this case the density of light-absorbing material is high, improving ambient-light rejection and contrast, but color artifacts may cause problems to the viewer. In FIG. 6B, the substrate thickness is such that the light-absorbing material is far enough from the microlens array so that no portion the image-forming spectrum is blocked (the ideal position for the light-absorbing material is indicated by the vertical solid line). In this case no undesirable color effects are caused by the screen but the density of light-absorbing material is sub-optimum, decreasing ambient-light rejection and contrast.

Figure 7:
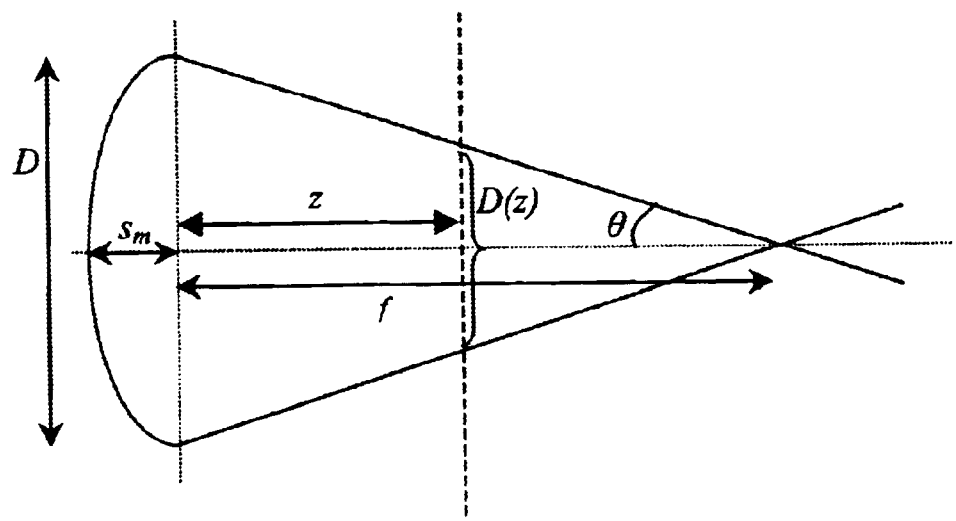
FIG. 7 shows focusing by a microlens and resulting spot size based on a ray picture.

Given that the optimum position for the light-absorbing material is now qualitatively understood, that is, the optimum position should maximize the density of light-absorbing material while allowing the image-forming spectrum through, we now proceed to calculate what that optimum position is as a function of the aperture-forming and image-forming conditions. For this purpose, let us estimate the size of the projected aperture formed by a given microlens on the light-absorbing material. This can be determined with the help of FIG. 7. If we note that the convergence angle $\theta$ is given by $$\tan\theta = \frac{D}{2f}, \quad (2)$$

where D is the diameter (aperture) of the focusing microlens unit and f is the focal distance, then the diameter as a function of the distance z to the projected aperture D(z) is given by $$D(z) = \left|\frac{f-z}{f}\right|D. \qquad (3)$$

To maintain mathematical simplicity and allow us to derive closed-form expressions we have neglected the maximum sag of the microlens ($s_m$) at this stage of our analysis. This is equivalent to assuming a thin-lens approximation with a well-defined focal point. In practice, however, we need to take into account the effect of microlens sag and this is best done by numerical means. We will discuss later how the expressions derived under the thin-lens approximation can be modified. In this purely geometric limit the projected aperture size is reduced to zero at the focal point and simply reproduces the microlens diameter when z=0.

Now let $f_{exp}$ be the focal length associated with the aperture-forming wavelength that creates the apertures in the light-absorbing material and $f_{max}$ be the focal position associated with the longest wavelength in the image-forming spectrum. The formation of the apertures is typically the result of a chemical interaction between the light-absorbing material and the aperture-forming illumination, which is confined to some interval between a minimum wavelength value $\lambda_{min}$ and a maximum value $\lambda_{max}$. There is typically a wavelength at which the sensitivity of the light-absorbing material is maximum: $\lambda_{peak}$. The chemical interaction with the aperture-forming illumination also generally occurs in a nonlinear fashion by means of energy thresholds. This means that an aperture is formed whenever the luminous energy impinging on the light-absorbing material exceeds some threshold $\epsilon(\lambda,\Delta t)$, which is dependent on the wavelength $\lambda_{min} \leq \lambda \leq \lambda_{max}$ and on the exposure time $\Delta t$. Short exposure times favor the wavelength of maximum sensitivity ($\lambda_{peak}$). However, as $\Delta t$ increases other wavelengths within the sensitivity range also become important, since eventually the threshold necessary to form apertures at these wavelengths is reached. For the purpose of optical design, it suffices to consider the minimum wavelength value of the aperture-forming spectrum that exceeds the threshold and creates apertures, since this value focuses the closest to the microlens. An exact determination of exposure parameters depends on the sensitivity of the light-absorbing material, which needs to be determined empirically or provided by the manufacturer. The focal length $f_{exp}$ is therefore associated with the smallest value of wavelength in the aperture-forming spectrum that exceeds threshold and is able to create apertures.

The conditions that (1) the position of the light-absorbing material must allow passage of the cone of light associated with the longest image-forming wavelength and (2) the density of light-absorbing material should be as high as possible, can be expressed in mathematical terms as follows:

$$\frac{\tau - f_{exp}}{f_{exp}}D = \frac{f_{max} - \tau}{f_{max}}D, \qquad (4)$$

where $\tau$ gives the best position for the light-absorbing material and, thus, represents the ideal substrate thickness. The above relation can be simplified to yield the following expression $$\frac{2}{\tau} = \frac{1}{f_{exp}} + \frac{1}{f_{max}}, \qquad (5)$$

which establishes in a rather simple form the position the light-absorbing material must satisfy with respect to the microlens array in order to operate optimally from an image-forming perspective. Relation (5) expresses very elegantly the relation between the position of the light-absorbing material ($\tau$), the focal distance of the aperture-forming wavelength ($f_{exp}$), and the focal distance of the longest image-forming wavelength ($f_{max}$). Note that the value $\tau$ only refers to the thickness of the substrate. Again, analogous to the discussion following Eq. (3), Eq. (5) is correct only within a paraxial approximation when the microlens thickness can be neglected. Later we discuss the more general case where the microlens thickness is taken into account.

Now that the best position for the light-absorbing material has been determined, we can proceed to characterize the performance of the screen with respect to the density of light-absorbing material, which directly impacts the contrast. A convenient way to define the density of light-absorbing material is to consider the ratio between the area of the aperture in the light-absorbing material and the area of a microlens element. If one further realizes that a measured area is proportional to the square of the diameter of the aperture, then the density of light-absorbing material $\rho$ as a function of the distance to the microlens array is given by $$\rho(z) = 1 - \frac{D^2(z)}{D^2} = 1 - \left(\frac{z - f_{exp}}{f_{exp}}\right)^2, \qquad (6)$$

where it is clearly seen that, at the location of the exposing wavelength focus, the density of light-absorbing material is 1, or 100%, in this purely geometric ray picture. Away from this focal point the aperture size increases and, naturally, the density of light-absorbing material decreases. The question then becomes what is the maximum possible density of light-absorbing material given that finite-size apertures are required for proper operation (since the cones of light in the image-forming spectrum must be allowed to reach the viewer).

To calculate the density at the optimum position, $\tau$, for the light-absorbing material it is necessary to combine Eqs. (5) and (6). For this purpose we can rewrite Eq. (5) in the following form $$\tau = \frac{2f_{exp}f_{max}}{f_{exp} + f_{max}}, \qquad (5.1)$$

and then insert the value of $\tau$ in Eq. (6) as follows $$\rho(\tau) = 1 - \left(\frac{\frac{2f_{exp}f_{max}}{f_{exp} + f_{max}} - f_{exp}}{f_{exp}}\right)^2 = \qquad (6.1)$$

$$1 - \left(\frac{f_{exp}f_{max} - f_{exp}^2}{f_{exp}f_{max} + f_{exp}^2}\right)^2 = 1 - \left(\frac{f_{max} - f_{exp}}{f_{max} + f_{exp}}\right),$$

which can be finally calculated to be $$\rho(\tau) = \frac{4f_{exp}f_{max}}{(f_{exp} + f_{max})^2}. \qquad (7)$$

The expression provided by Eq. (7) above defines the density of light-absorbing material at its optimum position $\tau$. In practice, however, the substrate presents thickness variations that can typically range from 2% up to 15%. It is preferable to maintain thickness variations to a minimum so that the light-absorbing material maintains a uniform appearance to the viewer. It can be seen from Eq. (6) that the worse situation occurs for $z=2f_{exp}$, in which case the density of light-absorbing material drops to zero. In practice, it is desirable to have a high density of light-absorbing material to ensure high contrast and effective ambient-light rejection. Since most of the surface area should be absorbing, let us impose 50% as the minimum tolerable density below which the screen is considered unacceptable. Optimum target values for the density are typically above 70%. Using Eq. (6) and constraining the density to be no less than 50% leads to the requirement $z<z_{max}$ where $$z_{max} = f_{exp}\left(1 + \frac{1}{\sqrt{2}}\right). \tag{8}$$

Consequently, to ensure that the density of light-absorbing material exceeds 50% and at the same time to allow the cone of light associated with the longest wavelength in the image-forming spectrum to be transmitted, the following condition must be satisfied by the target substrate thickness $\tau$ $$2\frac{f_{exp}f_{max}}{f_{exp} + f_{max}} \le \tau < f_{exp}\left(1 + \frac{1}{\sqrt{2}}\right), \tag{9}$$

which can be seen as the allowed tolerance on substrate thickness for the location of the light-absorbing material. Associated with the tolerance range stipulated by inequality (9) one finds the following variation in the density of the light-absorbing material $$\frac{1}{2} < \rho \le \frac{4f_{exp}f_{max}}{(f_{exp} + f_{max})^2}. \tag{10}$$

The above calculations allow the determination, within a thin-lens paraxial approximation, of the optimum position and density of light-absorbing material as a function of the spectral properties of the aperture-forming illumination and the spectral properties of the image-forming illumination. Also, it indicates the allowed variation of substrate thickness that still maintains an acceptable density of the light-absorbing material.

Now that we have shown how to determine the optimum position for the light-absorbing material in terms of the exposing and operating conditions and characterized its properties, it remains to determine the appropriate microlens array. According to the preferred embodiments of the present invention, each microlens in the array focuses substantially all aperture-forming light onto the light-absorbing material. The focusing is such that the density of light-absorbing material is maximized while allowing the cone of light associated with the longest wavelength of the image-forming spectrum to pass through. In addition, the present invention preferably provides that, while all lenses focus at least one of their axes at the light-absorbing material, the array itself as a whole is random. The means to achieve this remarkable effect are discussed below.

The surface profile of a given microlens is defined by a mathematical function that represents the sag or the depth measured with respect to a local coordinate system. The sag is typically defined in terms of radii of curvature and other terms such as conic constants, aspheric terms, or any other appropriate functional forms. To demonstrate this aspect of the invention, we choose the specific example of a one-dimensional array where each microlens is described by the following hybrid spherical/parabolic sag function $$s(x) = \alpha\left(R_s - \sqrt{R_s^2 - x^2}\right) + \frac{x^2}{2R_p}, \tag{11}$$

where $R_s$ represents the spherical radius of curvature, $R_p$ is a parabolic radius of curvature, and $\alpha$ is a scale factor to the spherical component of the sag function. In general, however, the sag function may assume a more complicated functional form. Extension to two dimensional cases can be done in a similar fashion by concentrating on a single axis if the microlens is anamorphic or using the same equation if the microlens is rotationally-symmetric since in this case the sag profile is dependent on a single radial local coordinate. If the sag is expressed as a more complex function, it is only required that the function be expanded in a Taylor series to determine the coefficient to the quadratic term since this term determines the focusing properties of the microlens. The Taylor series expansion for a sag function in general can be written as $$s(x) = \frac{x^2}{2R_{eq}} + \sum_{k=2}^{\infty} c_{2k} x^{2k}, \tag{12}$$

where $R_{eq}$ is an equivalent radius of curvature and $c_{2k}$ refers to higher-order terms. If such an expansion is carried out for the sag function expressed by Eq. (11) one finds that the equivalent radius of curvature is given by $$R_{eq} = \frac{R_p R_s}{\alpha R_p + R_s}. \tag{13}$$

We should now be reminded that the focal length is expressed in terms of the radius of curvature by means of Eq. (1). Also, the substrate thickness $\tau$ must obey Eq. (5) in order to maximize the amount of light-absorbing material and allow all of the image-forming spectrum to be transmitted. If we combine Eq. (1) with Eq. (5), we find that the radius of curvature must satisfy the following relation $$R_{eq} = \left(1 - \frac{1}{2n_{exp}} - \frac{1}{2n_{max}}\right)\tau, \tag{14}$$

which can now be combined with Eq. (13) to provide the following relation $$\frac{R_p R_s}{\alpha R_p + R_s} = \left(1 - \frac{1}{2n_{exp}} - \frac{1}{2n_{max}}\right)\tau, \tag{15}$$

The above expression establishes the relation between (1) the parameters that define each microlens in the array, (2) the thickness of the substrate, and (3) the material properties relevant to the creation of apertures and efficient light transmission through them. The above relation also shows the means to maintain a common substantial focus for the aperture-forming illumination for all lenses while allowing the array to be composed of randomly varying units: one or more parameters can assume random values while the others are constrained to obey Eq. (15). For example, if we allow $\alpha$ and $R_s$ to vary randomly within some appropriate range, then the value of $R_p$ calculated from Eq. (15) is given by $$R_p = \frac{R_s}{R_s / \left(1 - \frac{1}{2n_{exp}} - \frac{1}{2n_{max}}\right)\tau - \alpha}. \quad (15.1)$$

The specific range of variation for the parameters that define a given microlens are dependent on the desired focal positions for the aperture-forming illumination as well as the divergence angles for the image-forming illumination available to the viewer. This point will be discussed in more detail later.

Figure 8:
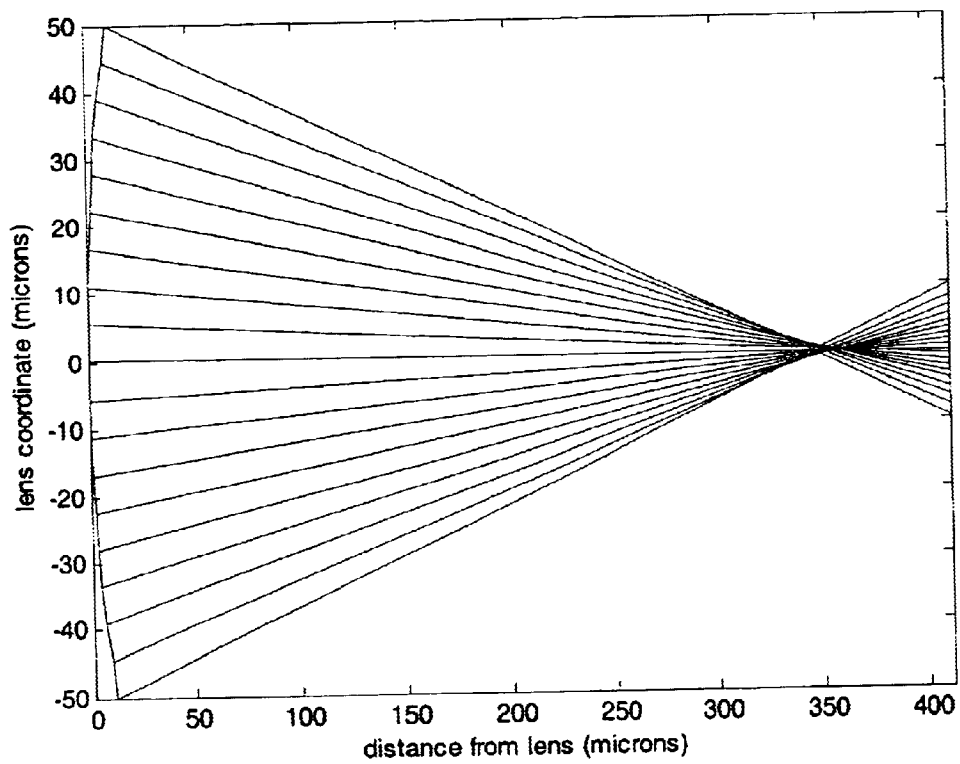
FIG. 8 shows a plot of rays focused by a single lens of diameter 100 microns.
Figure 9:
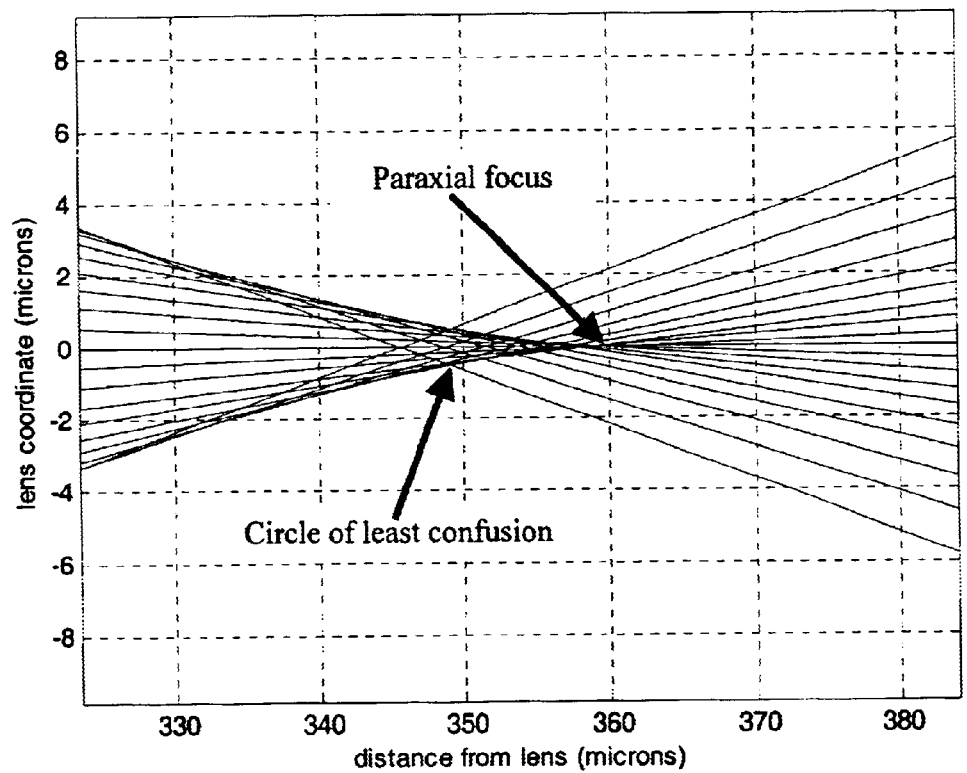
FIG. 9 shows in detail the focal point for the 100-micron lens shown in FIG. 8.

An important note regarding the above description of the screen design refers to the fact that the analysis is based on a paraxial approximation of the microlens focusing ability. For some applications, such as rear-projection television, the required divergence angles are such that the microlens sag is in the range between 15–40 $\mu$m with diameters between 30–80 $\mu$m and thus in general cannot be described accurately using the thin-lens paraxial approximation. This means that the relation for focal length expressed by Eq. (1) is no longer valid but should be replaced by another expression of the form $$f = f_0 + \Delta f, \quad (16)$$

where $f_0$ is the focal length calculated using Eq. (1) and $\Delta f$ represents a contribution that accounts for deviations from paraxial conditions. In this case, the whole range of geometric rays no longer concentrate on a single point but attain a minimum spot at the so-called "circle of least confusion." This phenomenon is illustrated in FIGS. 8 and 9 for a spherical lens ($R_p = \infty$, $R_s = 120$ $\mu$m, and $\alpha = 1$) separating air and a medium of index of refraction equal 1.5. According to Eq. (1) the paraxial focus is located 360 $\mu$m away from the vertex.

FIG. 8 shows calculated rays as refracted at the lens surface for a point source located at infinity and a lens diameter of 100 $\mu$m. A closer look at the focal point, FIG. 9, shows the paraxial focus and the circle of least confusion. For this case, the best focus is at 349 $\mu$m, implying that $\Delta f$ in Eq. (17) equals $-11$ $\mu$m. Taking into account the best focus position by means of Eq. (16), the previous analysis based on a paraxial approximation can be used to design the microlens array with proper corrections for those cases where the paraxial approximation cannot be adopted with acceptable accuracy. The means to modify the relevant equations to the non-paraxial case is shown in Table I. Unfortunately, there are no simple closed-form expressions for foci or aperture location and density of the light-absorbing material in the non-paraxial case. Consequently, the variation caused by the term $\Delta f$ needs to be determined numerically by means of optical ray-tracing computer programs that can be either custom developed or acquired commercially (examples include CODE V, OSLO, and ZEMAX). Examples of the results obtained using such a program (specifically, ZEMAX) are presented below For screen applications it is often desired to spread the image-forming illumination differently in the vertical and horizontal directions, generally with wider horizontal angle span. The horizontal viewing space is thus referred to as the fast axis while the vertical space is the slow axis. (In various of the figures, the fast axis is shown as having a vertical orientation for ease of presentation.) The reason for this nomenclature is that for a constant aperture, lenses with short focus lead to wider divergence angles and are said to be "fast". Similarly, lenses with long focus lead to narrow divergence angles and are said to be "slow". An important consequence of this distinction is that fast lenses are thicker than slow ones.

Figure 10:
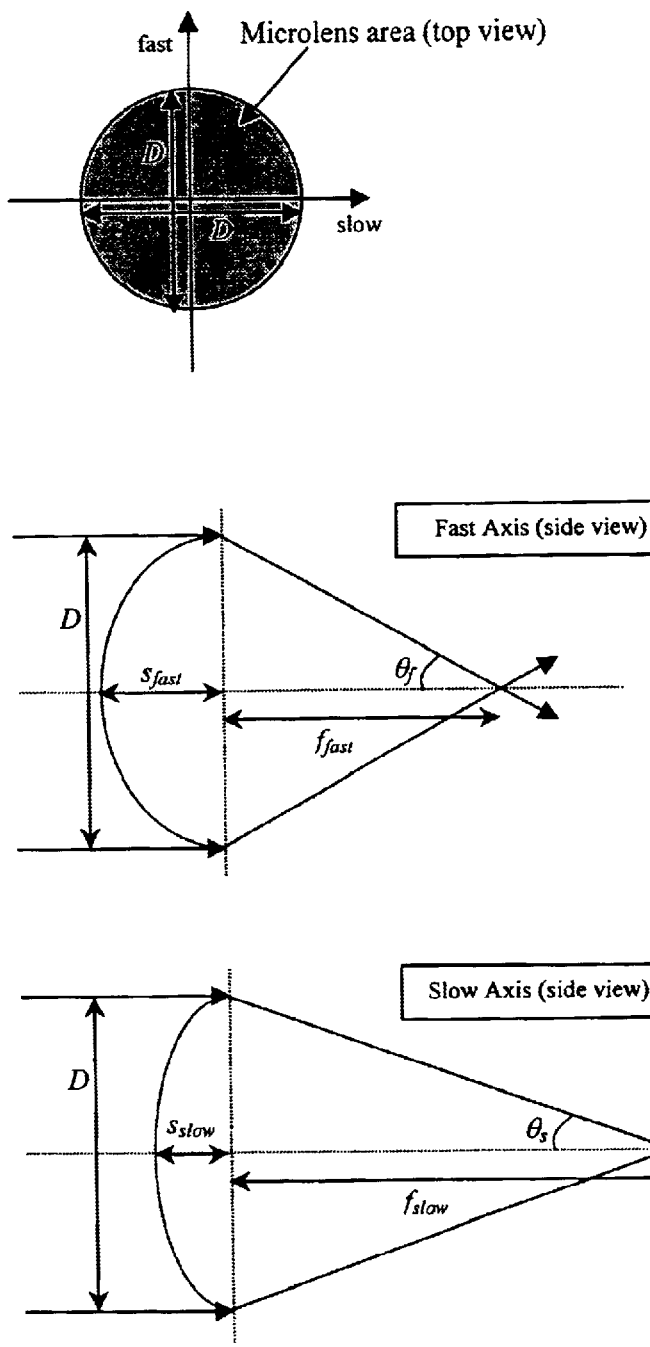
FIG. 10 illustrates focusing by an anamorphic microlens.

Two methods can be used to achieve a differing angular span for two perpendicular axes. The first method is to employ anamorphic lenses that provide different amounts of focusing power for the two perpendicular axes. This approach is illustrated in FIG. 10. The microlens diameter D is the same for each axis but the focusing powers are distinct, leading to distinct microlens sag values $s_{fast}$ and $s_{slow}$, along fast and slow directions, such that $s_{fast} > s_{slow}$.

Figure 11:
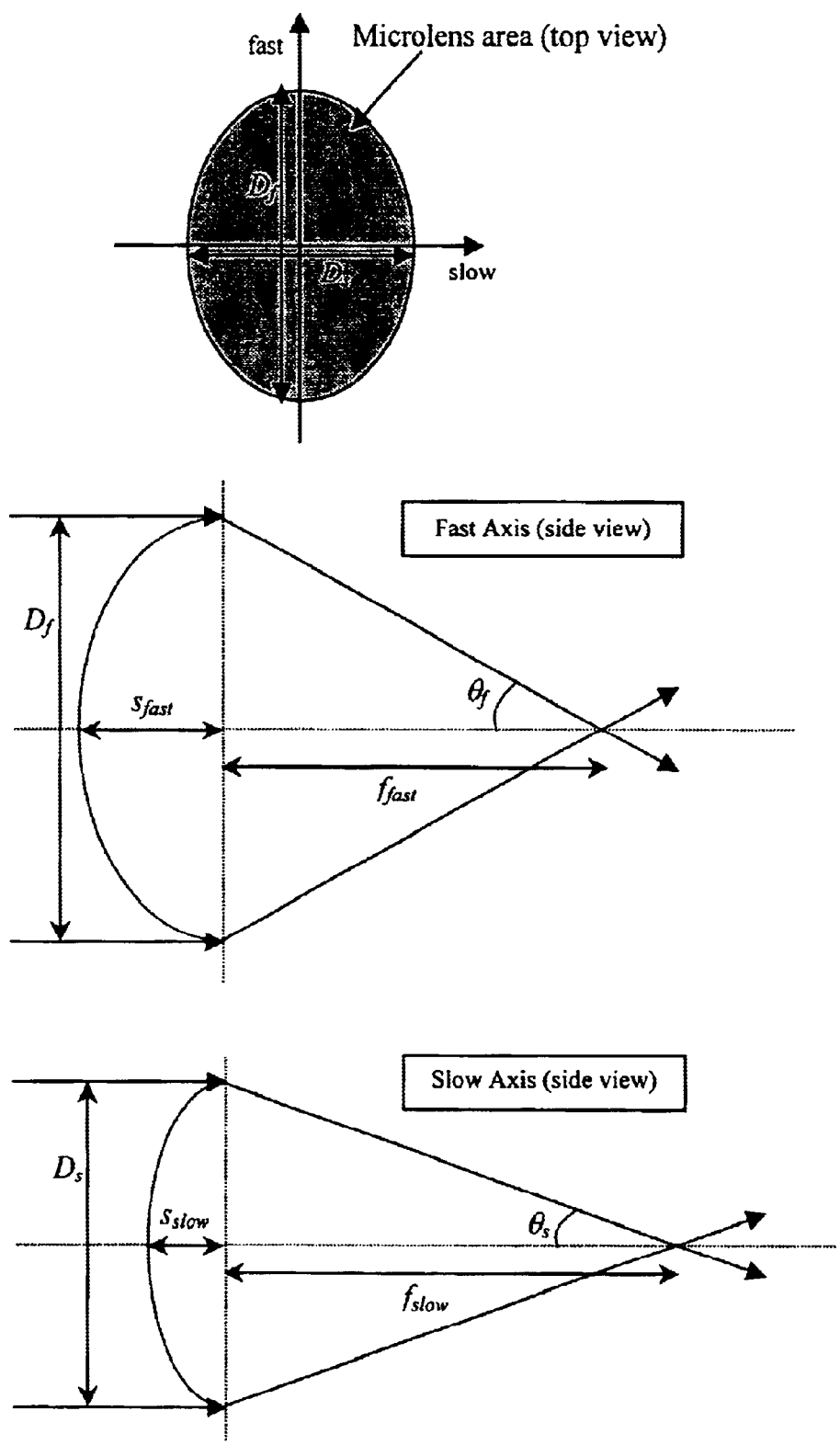
FIG. 11 illustrates focusing by an microlens with different diameters along the fast and slow axis.

The second method also typically, but not necessarily, uses anamorphic lenses but, in addition, uses different diameters along perpendicular directions. For an anamorphic microlens, this has the important advantage that the spatially-separated focal planes of the microlens are brought closer to each other compared to the spacing that would exist if the microlens had the same diameter along the two perpendicular directions. This is illustrated in FIG. 11. The fast axis has diameter $D_f$ while the slow-axis diameter is $D_s$ and the following relation is satisfied $D_f > D_s$.

The increase in diameter leads to increased microlens sag. To maintain the desired divergence, the increase in diameter must preserve the "speed" of the microlens, which determines the divergence and is basically defined by the f/number of the lens $f^\#$, given by $$f^\# = \frac{f}{D}, \quad (17)$$

where f and D denote the focal length and diameter, respectively. As can be seen from FIG. 7, the full divergence angle $\Delta\theta$ along a given axis is given by $$\Delta\theta = 2\arctan\frac{1}{2f^\#}, \quad (18)$$

where $\Delta\theta = 2\theta$ (again with reference to FIG. 7). Therefore, if one starts with an anamorphic microlens of diameter D and f/number $f^\#$ along the fast axis (focal distance $f_{fast}$) and wishes to bring the fast focus closer to the slow focus position, the new diameter $D_f$ must be given by $$D_f = \frac{f'_{fast}}{f^\#}, \quad (19)$$

where $f_{fast}$ is the new (longer) focal distance for the fast axis. The new focal distance, in turn, corresponds to a new radius of curvature for the fast axes in Eq. (1), i.e., R becomes larger. (The situation where the slow-axis diameter is made larger is also possible and in this case $D_s > D_f$. However, this case moves the focal distances for the fast and slow axes apart, rather than together, and thus is generally not useful in practice.) In general, the powers along the two axes will remain different after the diameter adjustment, although in some cases the powers could be substantially the same.

There are, of course, implications with the two methods described above (i.e., the same diameter with different powers versus different diameters with less different powers) described above. For instance, microlenses with larger diameters lead to deeper sags and this may pose fabrication difficulties. On the other hand, the focus spot due to an anamorphic microlens (same diameter along fast and slow directions) is slit-shaped while for distinct diameters it becomes an oval of smaller area leading to higher density of light-absorbing material. These aspects must be considered in the design according to performance specifications and fabrication capabilities. It should be noted that fast axis/slow axis issues may not be relevant if the screen is to relay information to a single user at near-normal viewing angles such as certain types of computer screens or portable movie (DVD) screens. In either case, i.e., whether or not spatial spread in viewer space is important, the present invention may be applied to produce an efficient high-contrast screen.

Figure 12:
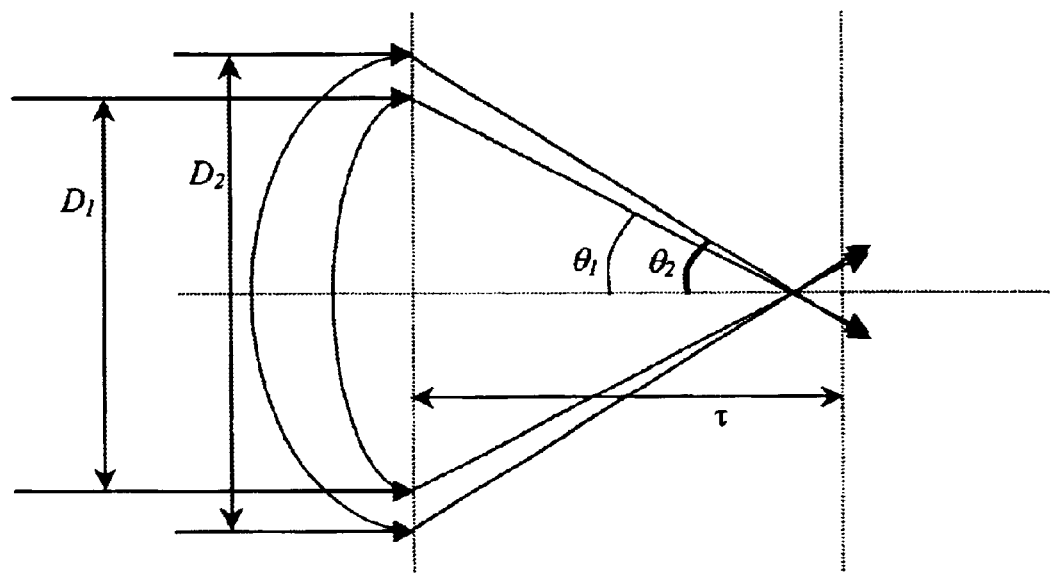
FIG. 12 illustrates the attainment of a wider divergence angle with a larger diameter.

The approach previously described allows the definition of a random array of microlenses that provides high density of light-absorbing material while allowing transmission of the image-forming spectrum. The next step consists of defining which focal plane is used to expose the layer of light-absorbing material. The simplest case occurs when the divergence angles and diameters are identical for the fast and slow axes, since in this case the fast and slow foci coincide. The main consequence of this fact is that the focal position of each microlens is constrained by the substrate thickness in order to achieve a desired density of the light absorbing material. On the other hand, if divergence angle is also to be controlled, i.e., if a fast axis and a slow axis are desired and a common aperture-forming focus is also desired for the fast and slow axes, the only way to do so is by changing the microlens diameter. This is shown in FIG. 12 where to illustrate the aperture-forming process, the illuminating wavelength belongs to the aperture forming spectrum although the same effect will be seen for the image forming spectrum. For diameter $D_1$ the divergence angle is $\theta_1$. To obtain a larger divergence $\theta_2 > \theta_1$ for the same focal position for the illuminating wavelength, one needs a larger diameter $D_2$, which leads to deeper microlenses.

Figure 13:
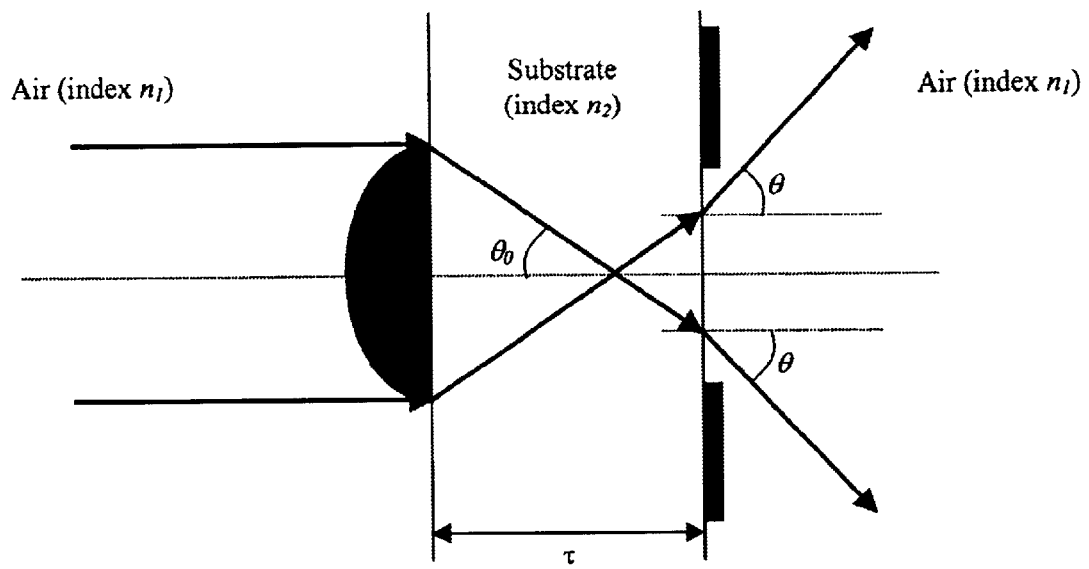
FIG. 13 illustrates the path followed by a light ray from air, through a microlens, substrate, and again refracted into air.

Before discussing the more general case of anamorphic microlenses, we will first establish the relation between divergence angle and microlens profile, since it is the difference in profile between the two axes of an anamorphic lens which for a common diameter results in different divergence angles along the two axes. (Note that as discussed above, for an anamorphic lens, both powers and diameters can be used to achieve the desired divergence angles and aperture characteristics. The microlens profile separates two media of distinct indices of refraction, typically air and plastic or glass. The divergence angle is related to the ability of the microlens to bend rays at high angles and this feature, in turn, is related to the slope angle of the microlens profile at a given location. Since slope angle is determined by the derivative of a function, it becomes clear that the divergence angles are determined by the derivative of the sag and not the sag itself. This is illustrated in FIG. 13, which shows an individual microlens, a substrate, and a layer of light-absorbing material. Light is incident from the microlens side, focuses through the substrate and further propagates into air. Let the function s denote the microlens sag profile and s' its first derivative. If $\theta_1$ denotes the angle of incidence on the microlens surface and $\theta_2$ is the refracted angle into the substrate, then Snell's law states that $$n_1 \sin(\arctan s') = n_2 \sin \theta_2, \quad (20)$$

where we note that the incident angle is given by the arctangent of the derivative of the sag profile. With reference to FIG. 13, note that $\theta_0 = \theta_1 - \theta_2$. The total divergence angle $\Delta\theta$ in viewer space is given by $2\theta$. If we substitute these results into Eq. (20) and once again use Snell's law to transfer from the substrate into air (viewer space), the following relation is found $$n_1 \sin(\arctan s') = n_2 \sin\left[\arctan s' - \arcsin\left(\frac{n_1}{n_2}\sin\frac{1}{2}\Delta\theta\right)\right], \quad (21)$$

which establishes a transcendental relation between slope angle (related to the derivative of sag function) and divergence angle in viewer space ($\Delta\theta$), given the material parameters. When designing a particular screen with full divergence angle $\Delta\theta$, it is thus necessary to define the functional form of the sag function, which may depend on several parameters as in the case of Eq. (11). The use of Eq. (21) then determines the relation that must be satisfied by these parameters to ensure a given value of $\Delta\theta$.

As we have seen, if the fast and slow angle divergence are the same, the substrate thickness defines the focal position for the microlenses and if any control of divergence angles in viewer space is then desired, it can be attained only with variation of microlens diameter. However, if the divergence angles are allowed to be distinct from the beginning, i.e., if the divergence angles are allowed to be a function of profile configuration as opposed to just microlens diameter, greater design flexibility ensues. The reason is that in this case, a given axis can be used for exposure of the light-absorbing material while the other axis is used to control divergence along the remaining direction without being constrained by the substrate thickness.

Figure 14:
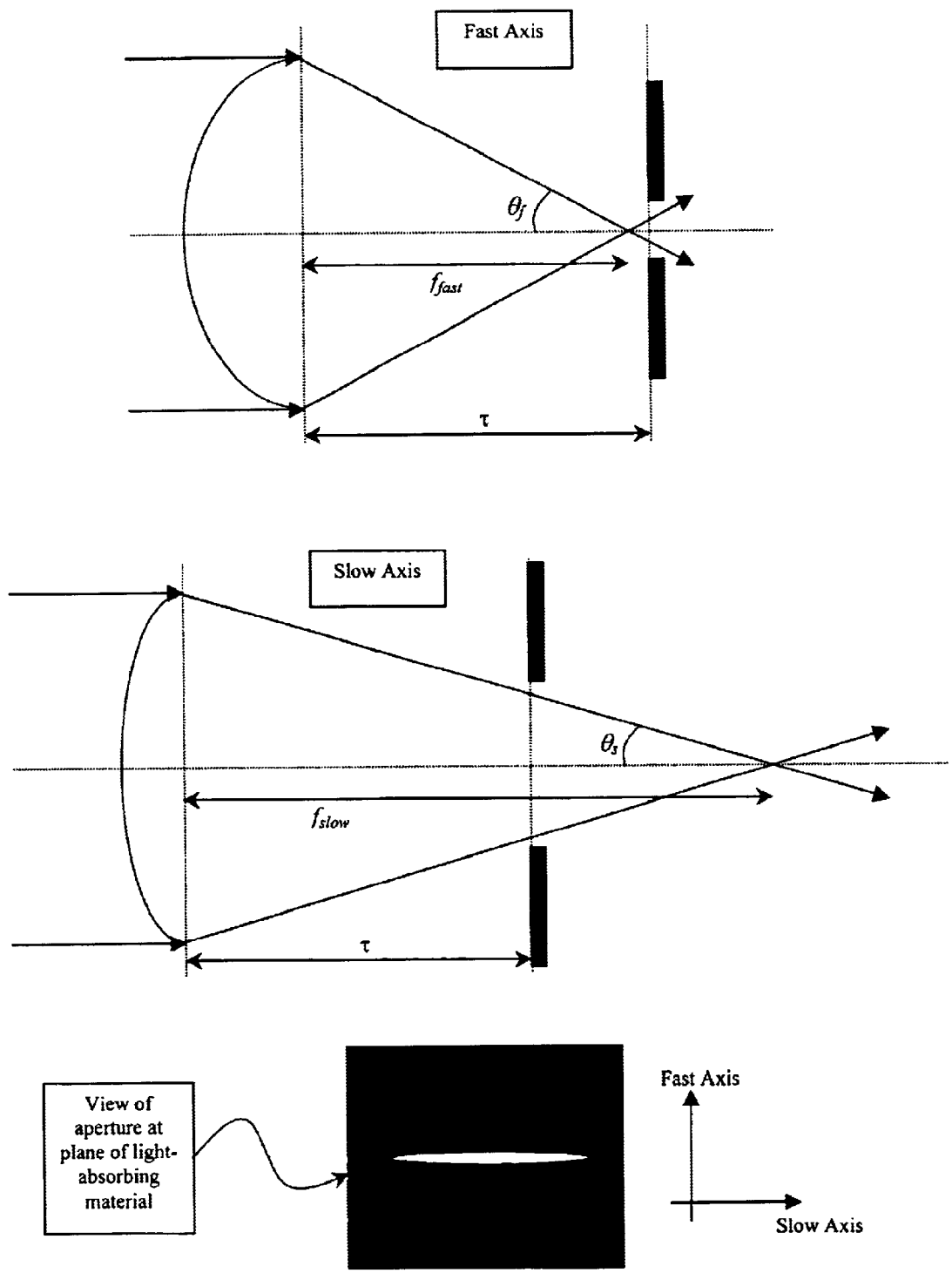
FIG. 14 illustrates a screen configuration that uses the fast axis to create apertures in the light-absorbing material.

A first possibility is to use the fast axis to expose the light-absorbing material as illustrated in FIG. 14. In this case, the fast axis divergence is controlled by the substrate thickness and the microlens diameter. Since, as we have stated before, the fast axis represents the direction of wide angle divergence, this configuration generally requires thin substrates, in the range of 25–50 μm depending on the desired divergence angle. Again the fast axis divergence can be further controlled by means of the fast-axis microlens diameter. The slow axis divergence on the other hand is controlled by the slow axis sag, which can be determined independently of the fast axis sag, because of the anamorphic nature of the microlenses. The slow axis diameter can also be used for slow-axis divergence control. An illustration of the image of the aperture shape at the light-absorbing material is also shown in FIG. 14.

Figure 15:
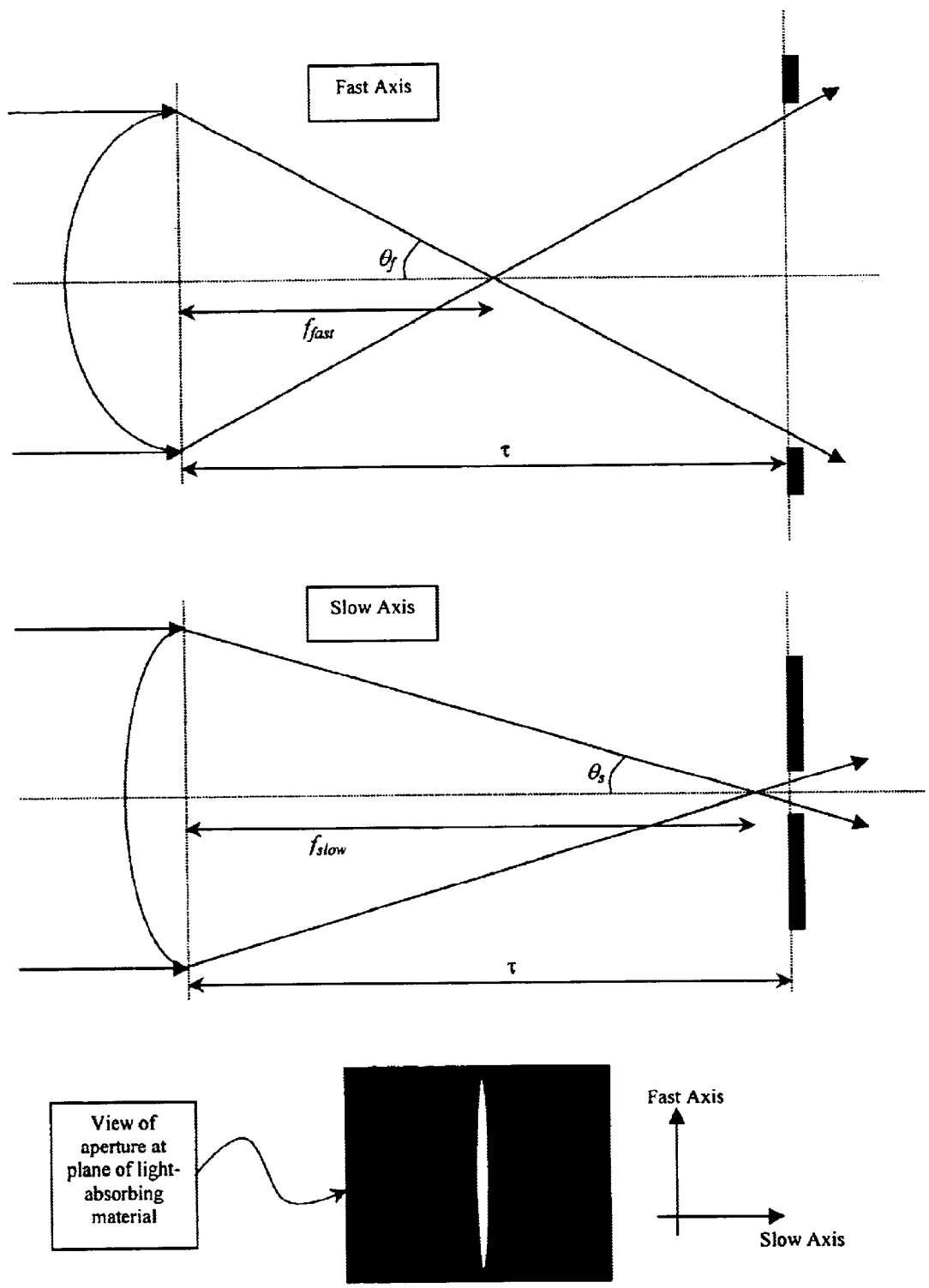
FIG. 15 illustrates a screen configuration that uses the slow axis to create apertures in the light-absorbing material.

The second possibility is to employ the slow axis to expose the light-absorbing material as illustrated in FIG. 15. Here the slow-axis divergence is controlled by the microlens diameter and substrate thickness. The fast-axis divergence is controlled by the microlens sag and diameter, independently of the slow-axis constraints. The aperture in the light-absorbing material is rotated with respect to the first approach.

Either one of the above two methods can be used in the screen design but some considerations must be taken into account based on manufacturability. The first method (aperture formation with fast axis) generally provides higher density of light-absorbing material since focusing occurs closer to the microlens (smaller focal spot). However, there may be difficulties in the availability of thin substrates. Also, substrate thickness variations become more critical in this case. Control of fast-axis divergence is more limited because it requires increasing the microlens diameter, which leads to increased sag and may pose fabrication difficulties. The second method (aperture formation with slow axis) generally provides lower density of light-absorbing material compared with the first method since focusing occurs farther away from to the microlens (larger focal spot). On the other hand, thicker substrates (typically in the range 75–125 μm) are more readily available commercially and with better controlled thickness variations. Also, because of the higher f/number, the depth of focus is longer, making thickness variation of the substrate less critical. Control of fast-axis divergence is more flexible in this case because it is more easily controlled with microlens sag, irrespective of substrate thickness. In terms of cost, implementation of the first method (aperture formation with fast axis) is generally more expensive than the second method (aperture formation with slow axis).

The final component in the definition of the screen refers to the spatial distribution of the microlenses in the array. To maximize light transmission (efficiency) the microlens arrangement preferably is close-packed so that most of the incident light can be focused and transmitted through the apertures formed in the light-absorbing material. This means that the area of the microlens array not used for focusing is minimized. In addition to affecting the efficiency of the screen, the spatial arrangement also determines the three-dimensional intensity distribution in viewer space. Thus, for a square array the energy is distributed over a square area and for a hexagonal array the energy concentrates over a hexagonal area.

Figure 16:
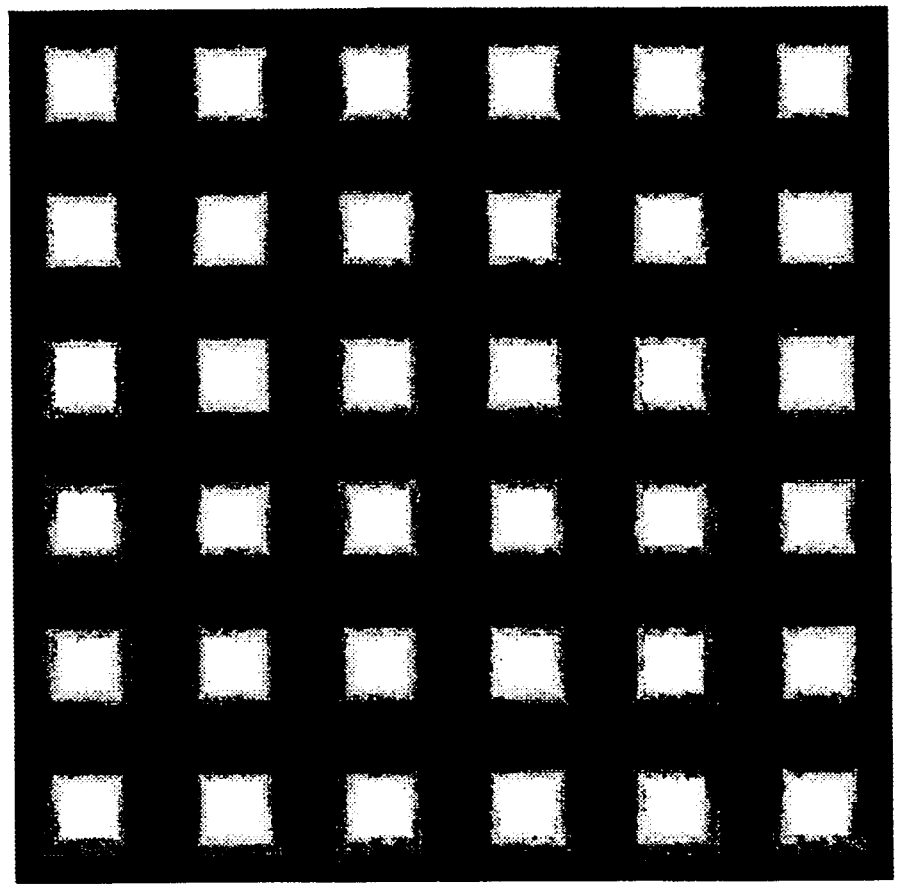
FIG. 16 illustrates a microlens array with a square close-packed spatial arrangement.
Figure 17:
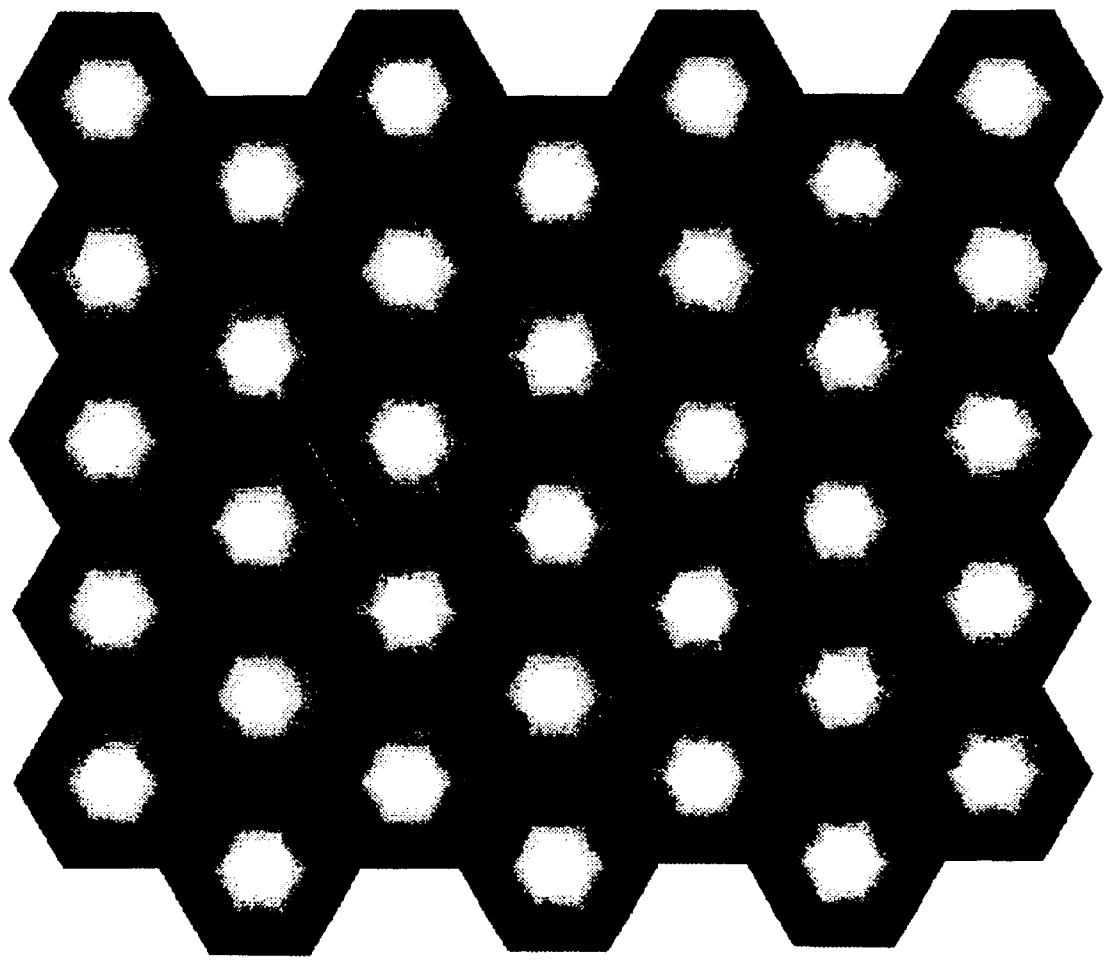
FIG. 17 illustrates a microlens array with a hexagonal close-packed spatial arrangement.
Figure 18:
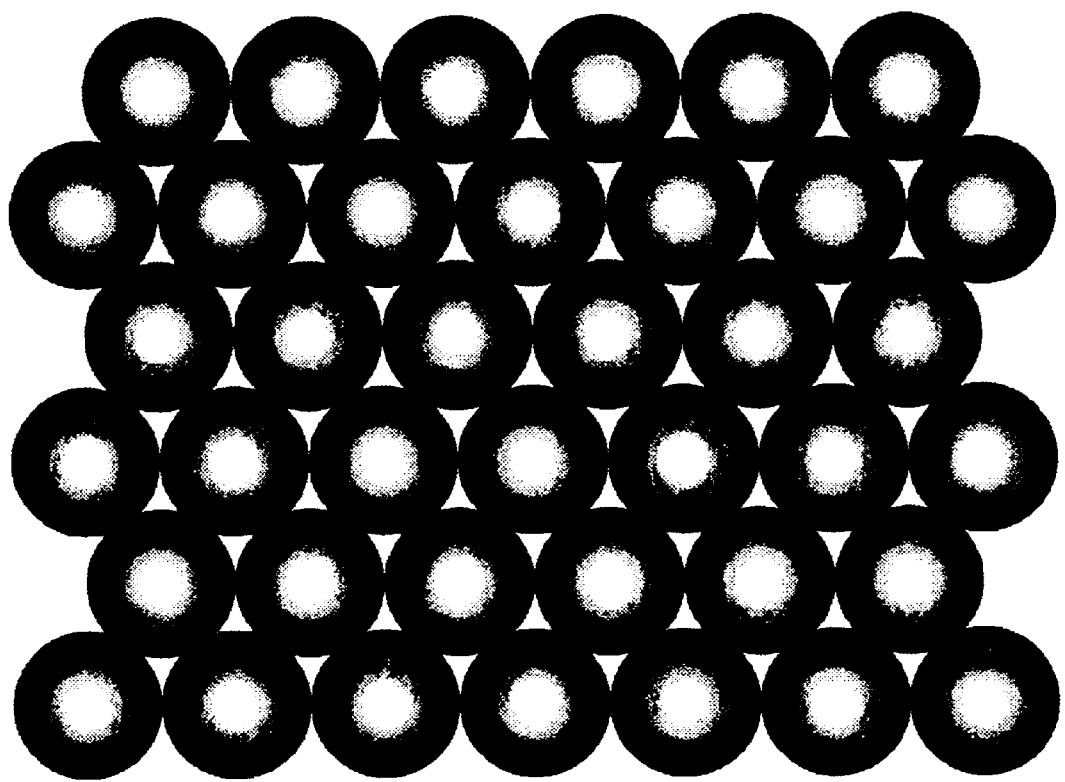
FIG. 18 illustrates a microlens array of spherical boundaries with a hexagonal close-packed spatial arrangement.
Figure 19:
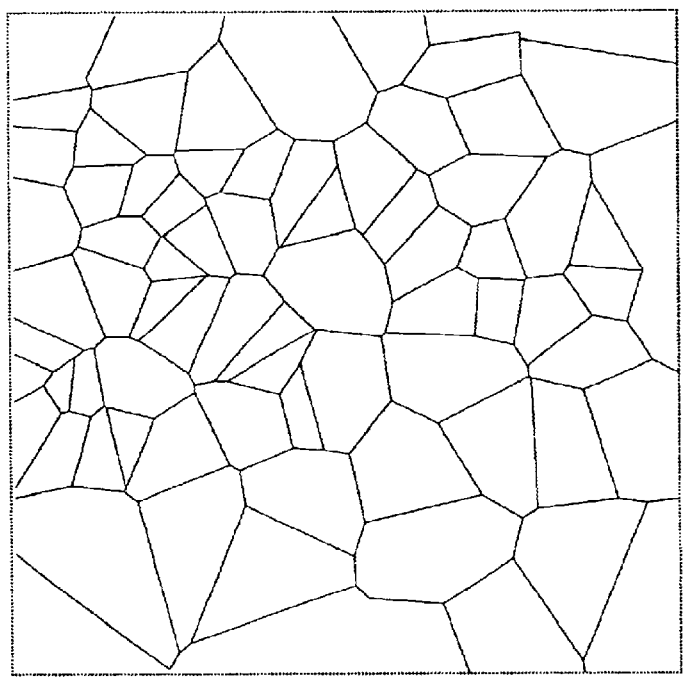
FIG. 19 illustrates boundaries of microlenses in a random spatial arrangement.

Some of the preferred spatial arrangements according to the present invention include: (1) square close-packed; (2) hexagonal close-packed; (3) hexagonal close packing of microlenses with spherical boundaries; and (4) random polygonal-boundary lenses. An illustration of the square close-packed arrangement is shown in FIG. 16. The hexagonal close-packed arrangement is seen in FIG. 17. The hexagonal arrangement of microlenses with spherical boundaries is shown in FIG. 18. FIG. 19 shows an illustration of the boundaries of an array where the microlens boundaries constitute random polygonal lines.

Figure 20A:
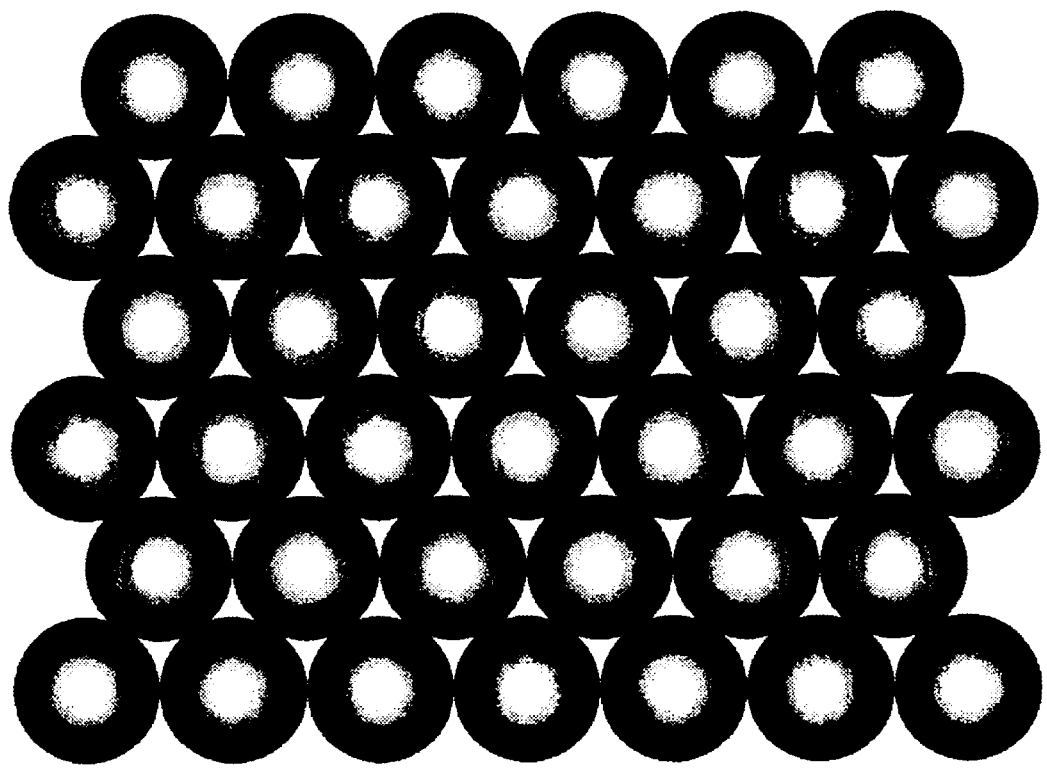
FIG. 20A illustrates a microlens array of spherical boundaries with a hexagonal close-packed spatial arrangement and random interpolation between microlenses.

The interstices between lenses can be kept constant or varied randomly. Another variant of this arrangement is illustrated in FIG. 20A illustrates a lens array where the interstices between lenses exhibit a random sag interpolation to minimize the occurrence of artifacts in the projected image. The importance of interpolation occurs whenever the area covered by the microlenses is less than 100% leading to non-focusing (interstitial) regions. Maintaining interstitial regions at constant depth may be acceptable in some cases but for screen applications it may lead to visual artifacts if the interstices are regularly arranged across the array.

Figure 20B:
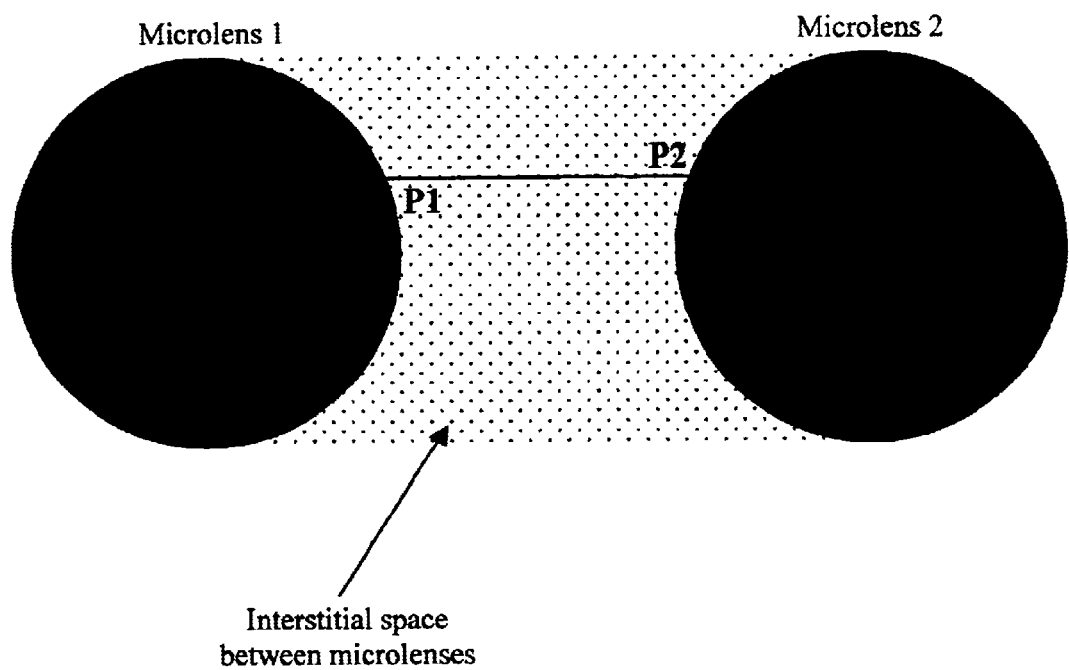
FIG. 20B illustrates an interpolation function between two points on the perimeter of two microlenses.
Figure 20B:
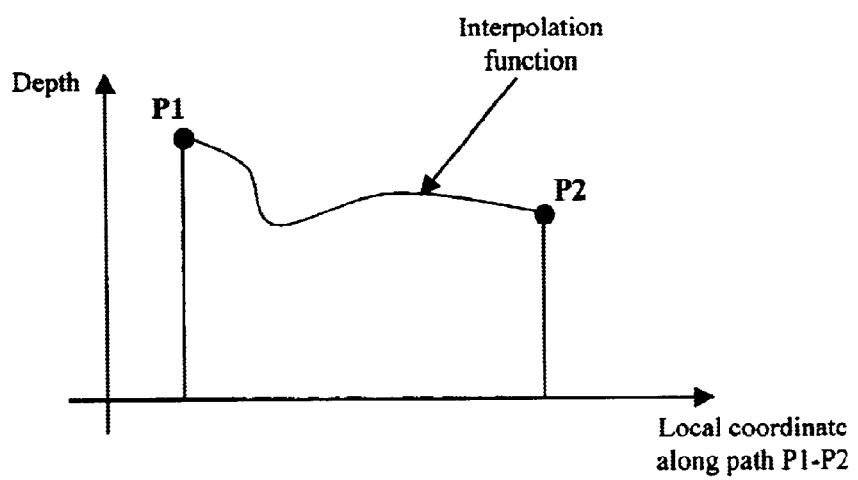

A method for introducing this interstitial random interpolation is illustrated in FIG. 20B. For simplicity, consider two microlenses (1 and 2, as shown) and two points at the border of each microlens (point P1 on microlens 1 and point P2 on microlens 2). The interstitial non-focusing region between the microlenses is also indicated as the dotted area. There is a depth associated with point P1 and also with point P2. Because the microlenses in the array are preferably randomized, these two depth values are, in general, not identical.

As shown in the lower portion of FIG. 20B, in accordance with the invention, the depth variation along a path between points P1 and P2 is defined by an interpolation function that defines how the depth varies when going from point P1 on microlens 1 to point P2 on microlens 2. The interpolation function can be any function that connects points P1 and P2 in a preferably continuous manner. The maximum depth observed within the interpolation function preferably does not exceed the depths at points P1 and P2. The path between points P1 and P2 can also be arbitrary as long as the whole interstitial region is covered. The preferable approach is to consider a direct line between opposite points on the perimeter of two neighboring microlenses (if the array is regular) or a horizontal/vertical line towards the nearest microlens perimeter point (for general arrays). Since the microlens array is preferably random, the interpolation function between any two perimeter points will also preferably be random leading to a more homogeneous scattering pattern. In addition, it facilitates manufacturing because sudden depth variations are avoided.

Figure 21:
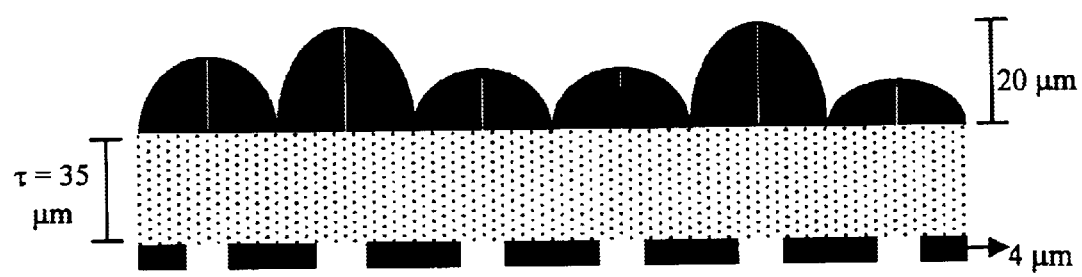
FIG. 21 illustrates a cross-section of a screen geometry used in a practical demonstration. The dimensions shown in this figure are representative.
Figure 22:
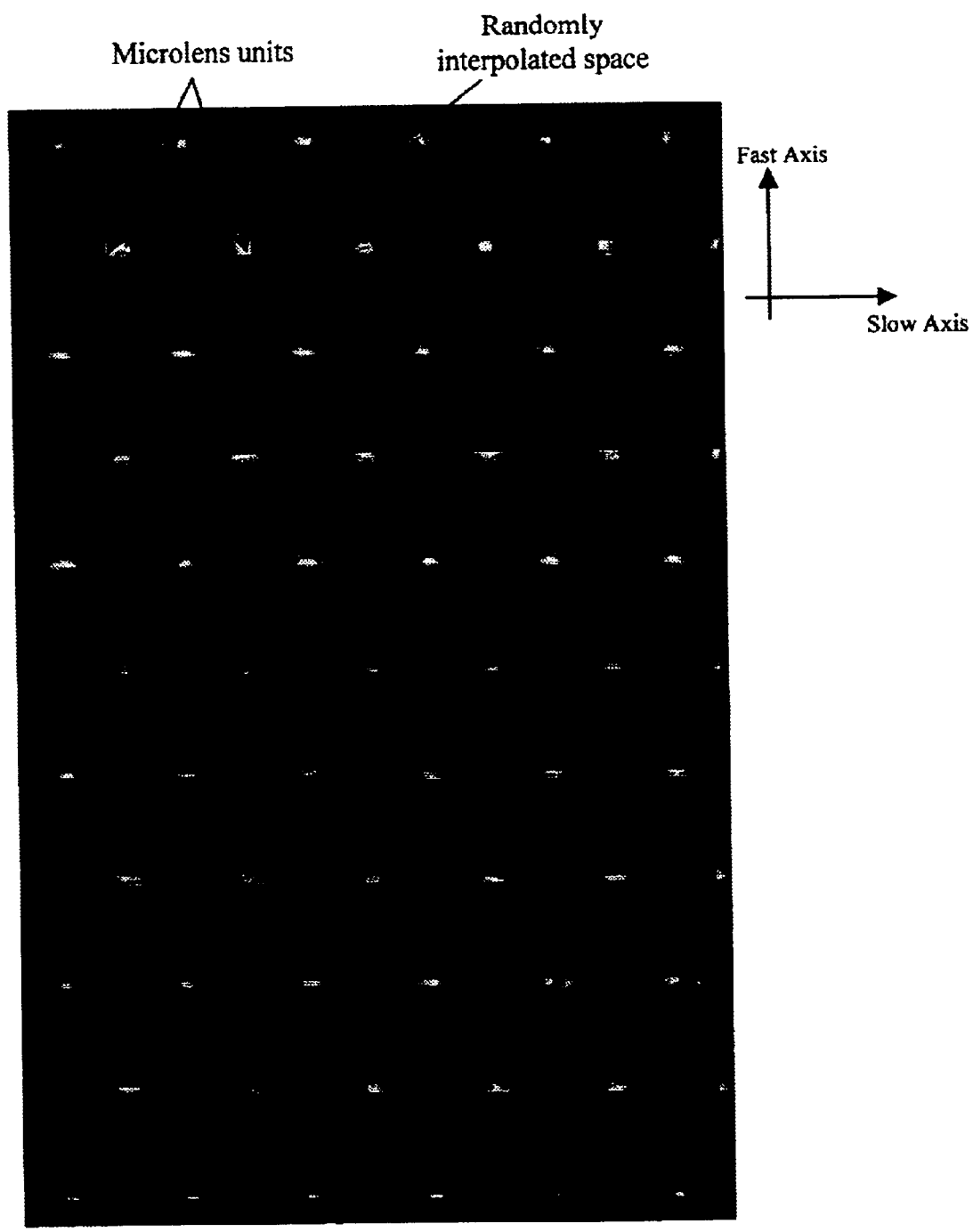
FIG. 22 shows a top view microscope picture of a random anamorphic microlens array of circular boundaries in a hexagonal arrangement.

A practical example is now used to demonstrate the concepts previously described. This experimental demonstration employs the fast axis in the creation of apertures in the light-absorbing material. A side view of the screen structure with representative dimensions is shown in FIG. 21. The total depth of the polycarbonate microlens array is 20 microns with a polycarbonate substrate of 35-micron thickness. The light-absorbing material, made of a commercially available material sold under the trademark MATCHPRINT manufactured by Imation Inc., Oakdale, Minn., presents about 4 microns of thickness. A top view (microscope picture) of the microlens structure is shown in FIG. 22. The lenses are anamorphic with the fast axis running along the vertical direction of this figure. In use, the fast axis will typically be oriented horizontally. The spatial arrangement is a close-packed hexagonal placement of microlenses with spherical boundaries. In the interstitial spaces between microlenses, a random interpolation is carried out whereby the depth varies along the fast direction dictated by the sag of two neighboring lenses.

Figure 23:
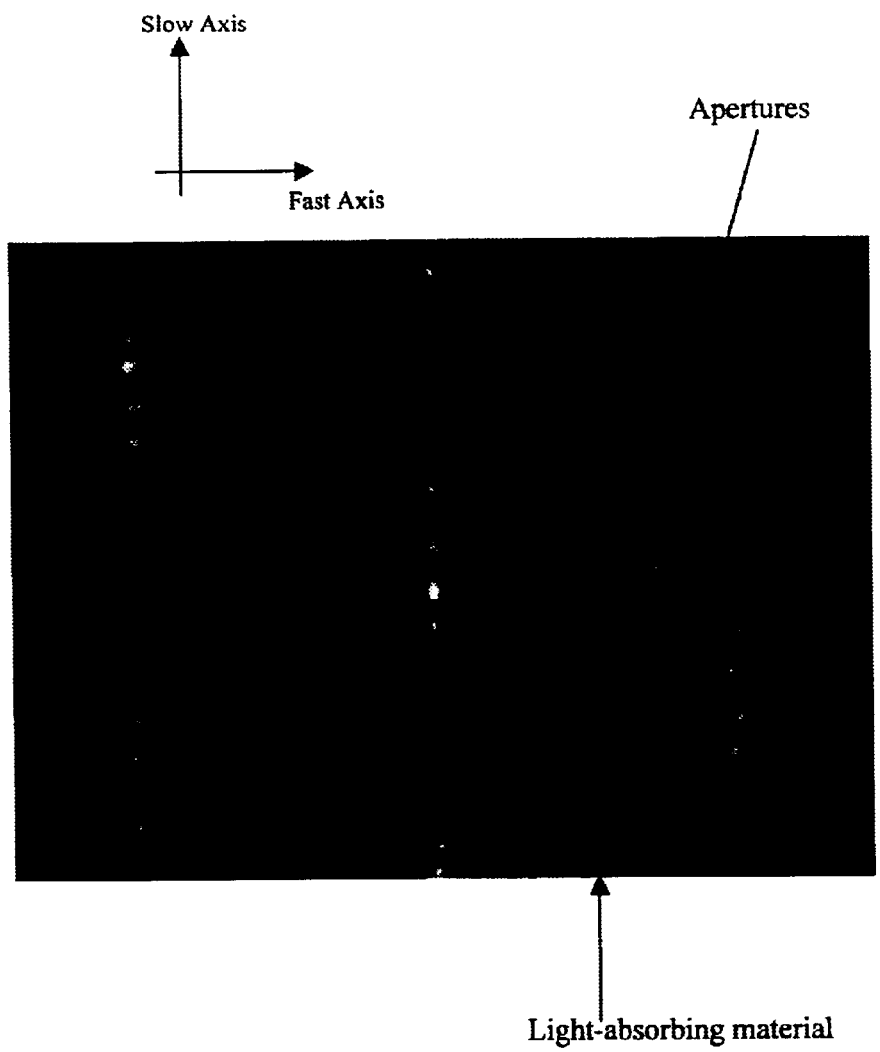
FIG. 23 illustrates apertures created in the light-absorbing material for the screen geometry shown in FIGS. 21 and 22.
Figure 24:
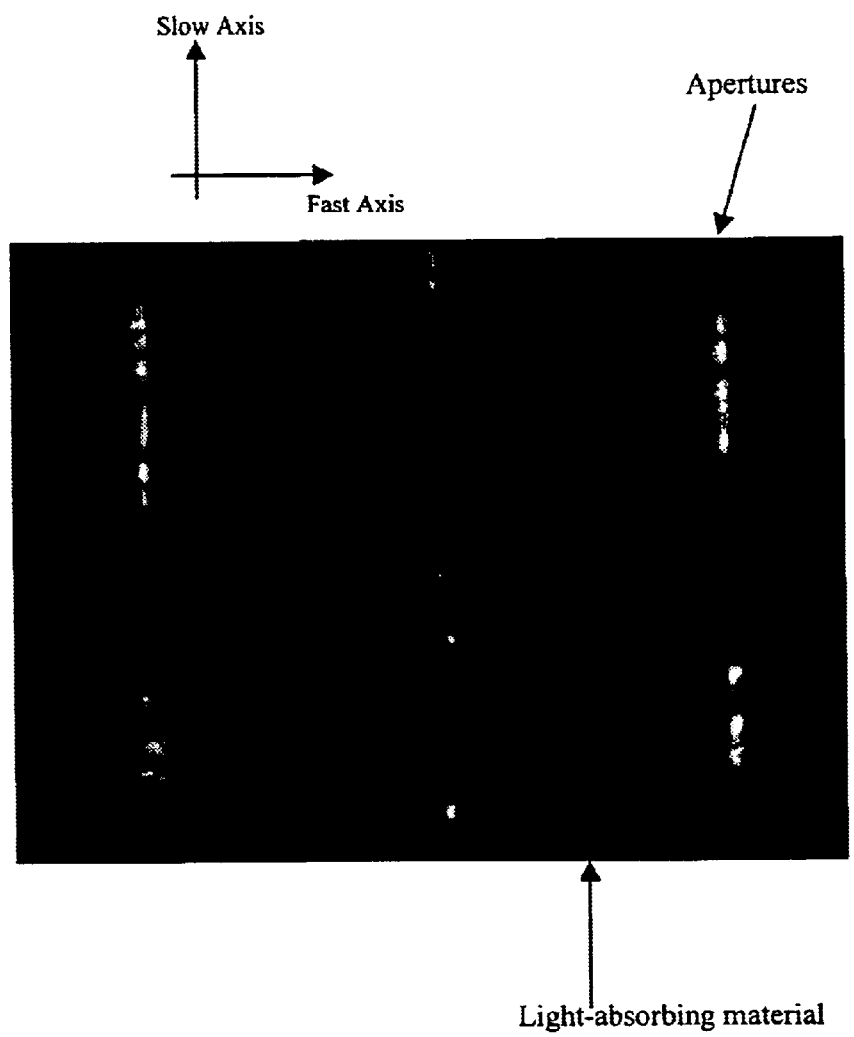
FIG. 24 illustrates apertures created in the light-absorbing material for the screen geometry shown in FIGS. 21 and 22 with a longer aperture-creating ultraviolet exposure than in FIG. 23.
Figure 25:
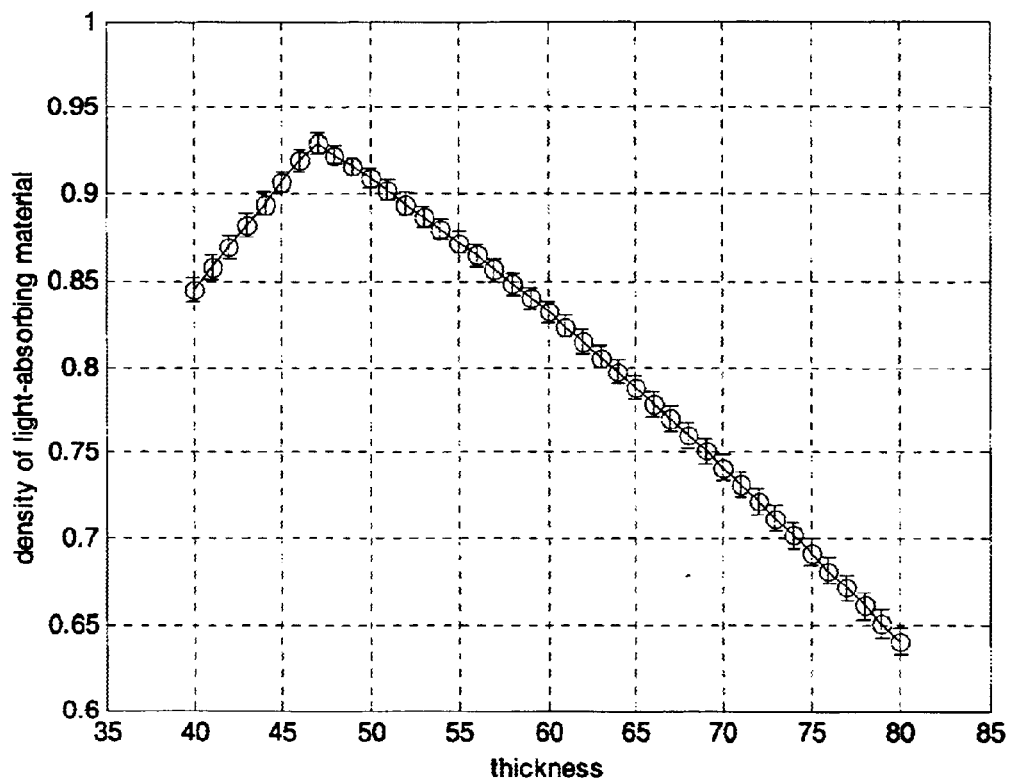
FIG. 25 shows the variation in density of light-absorbing material as a function of substrate thickness for a screen design with target thickness 50 microns and depth of microlens array 20 microns.
Figure 26:
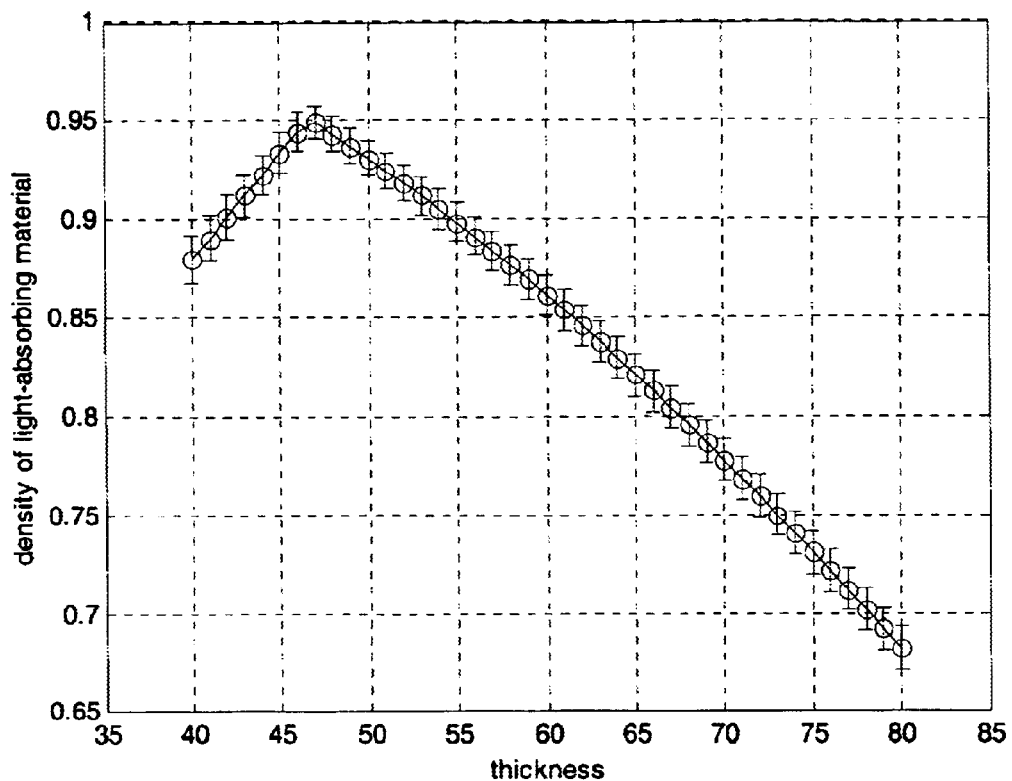
FIG. 26 shows the variation in density of light-absorbing material as a function of substrate thickness for a screen design with target thickness 50 microns and depth of microlens array 30 microns.
Figure 27:
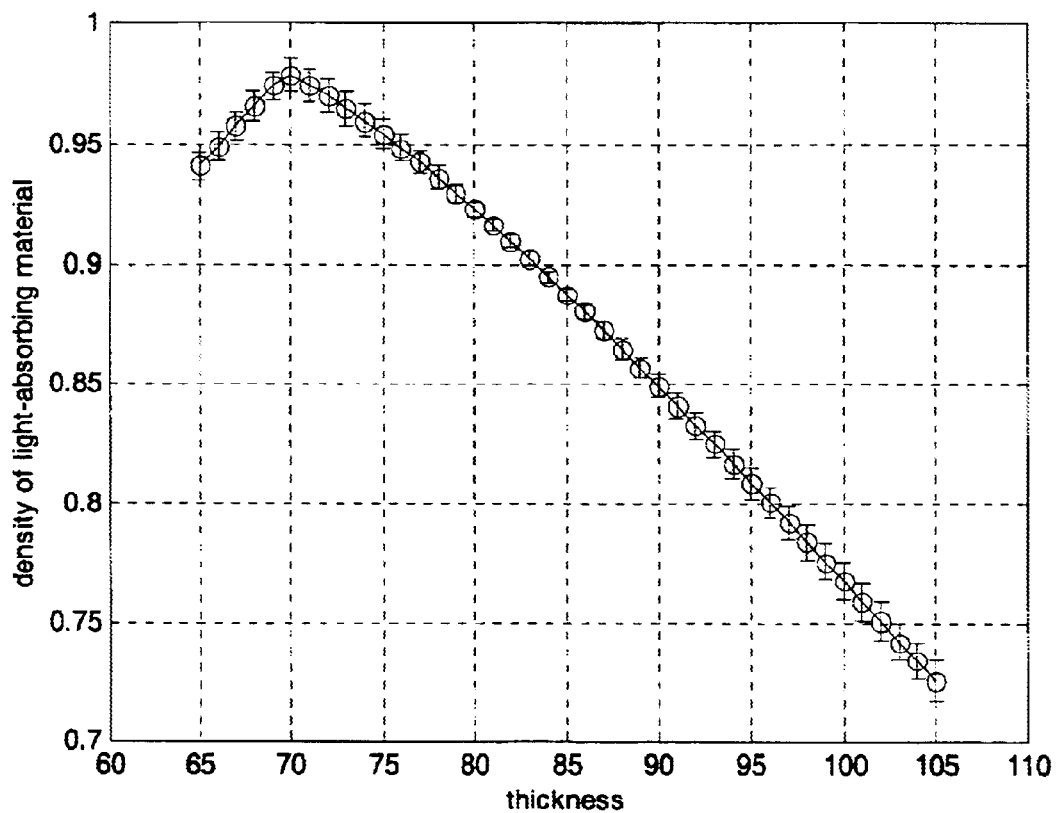
FIG. 27 shows the variation in density of light-absorbing material as a function of substrate thickness for a screen design with target thickness 75 microns and depth of microlens array 20 microns.
Figure 28:
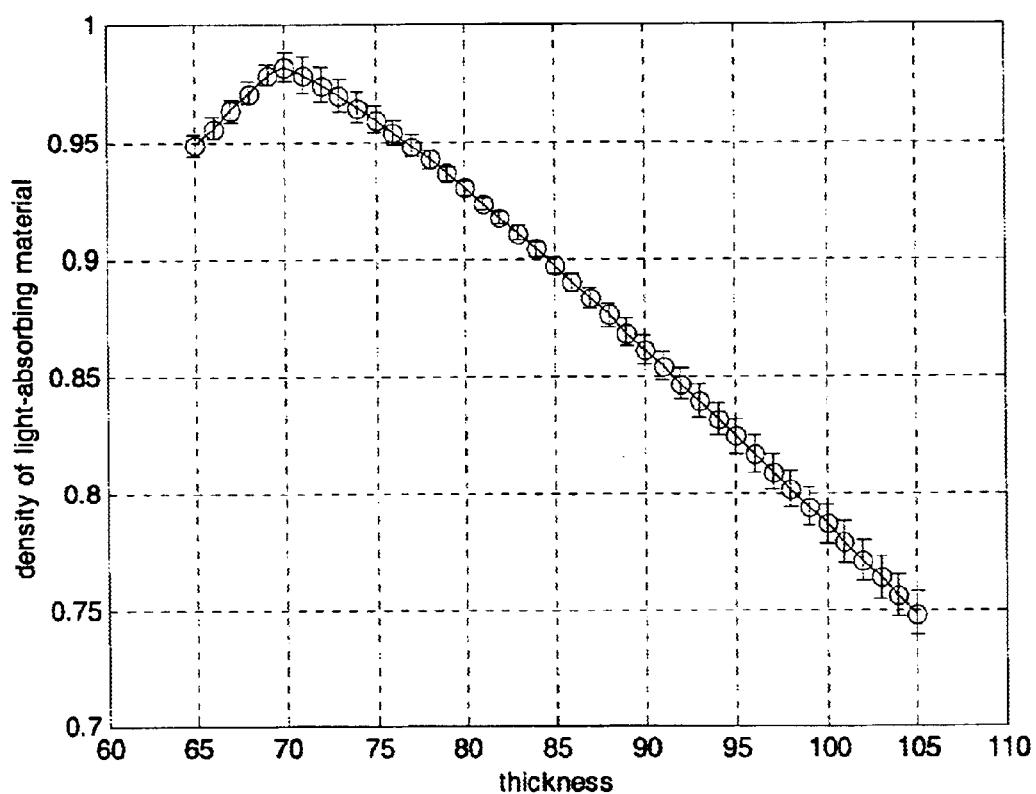
FIG. 28 shows the variation in density of light-absorbing material as a function of substrate thickness for a screen design with target thickness 75 microns and depth of microlens array 30 microns.
Figure 29:
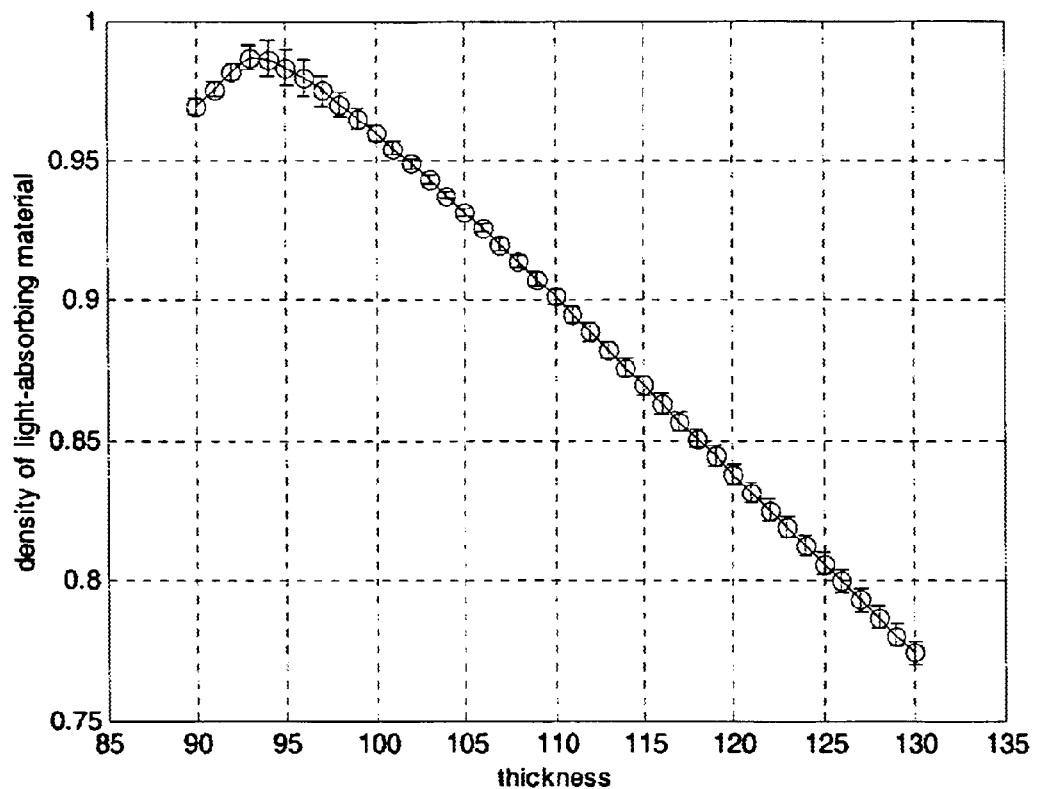
FIG. 29 shows the variation in density of light-absorbing material as a function of substrate thickness for a screen design with target thickness 100 microns and depth of microlens array 20 microns.
Figure 30:
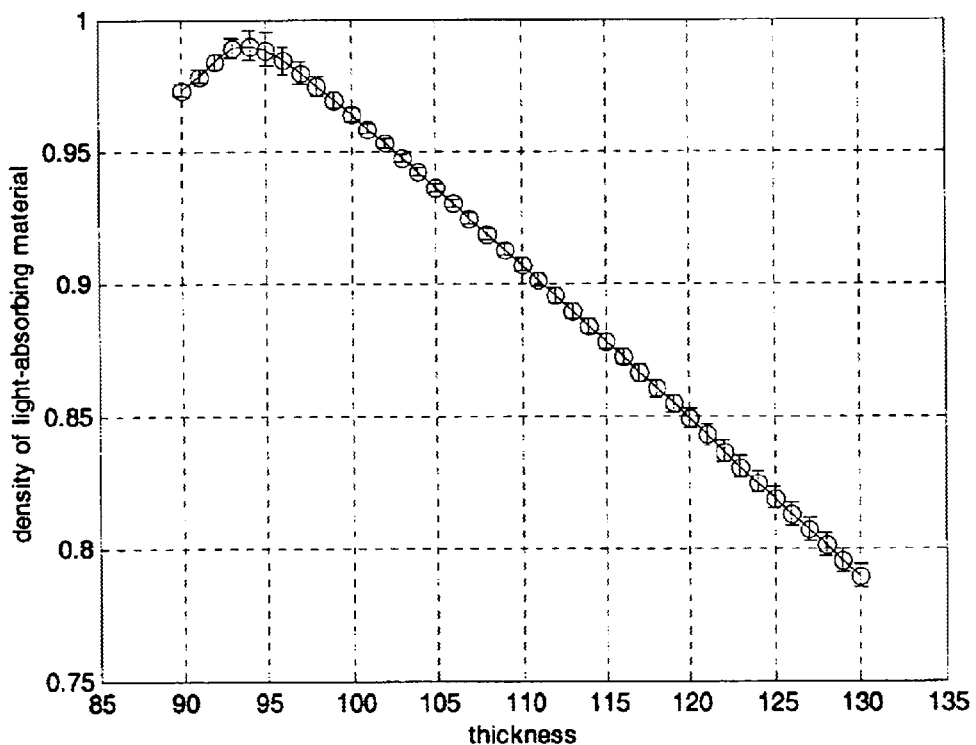
FIG. 30 shows the variation in density of light-absorbing material as a function of substrate thickness for a screen design with target thickness 100 microns and depth of microlens array 30 microns.
Figure 31:
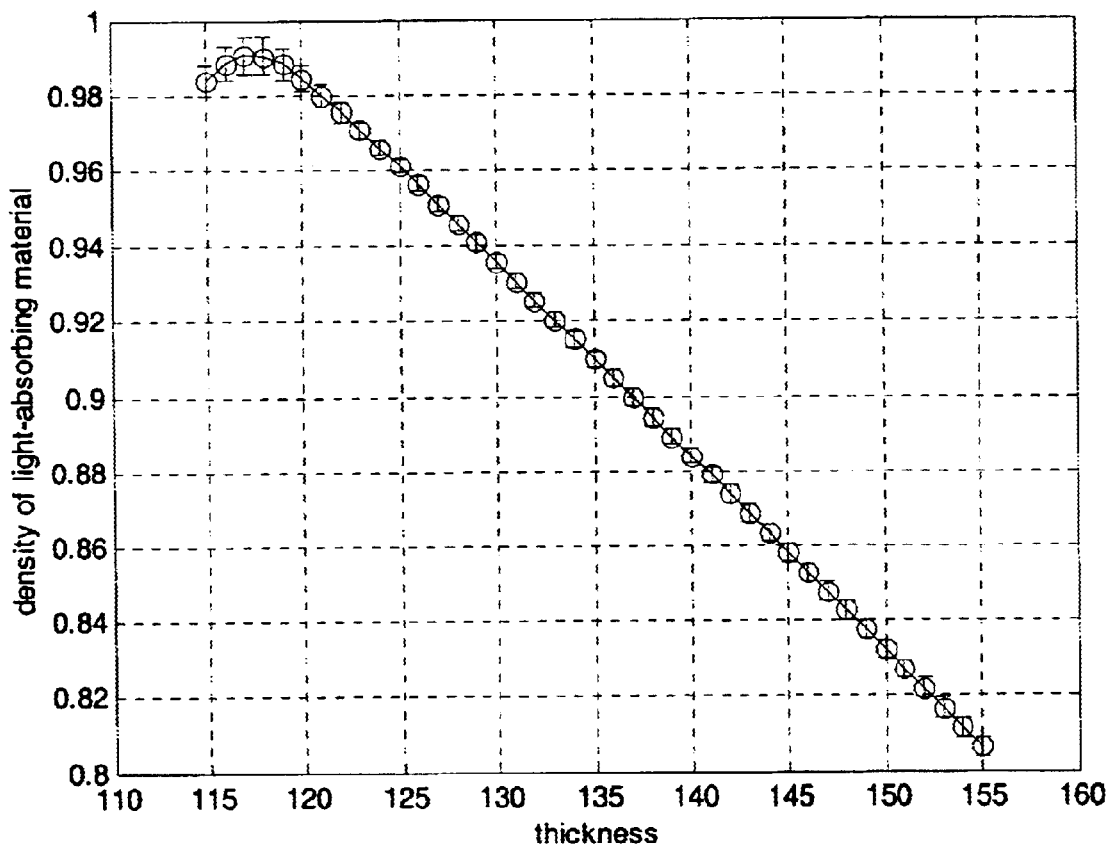
FIG. 31 shows the variation in density of light-absorbing material as a function of substrate thickness for a screen design with target thickness 125 microns and depth of microlens array 20 microns.
Figure 32:
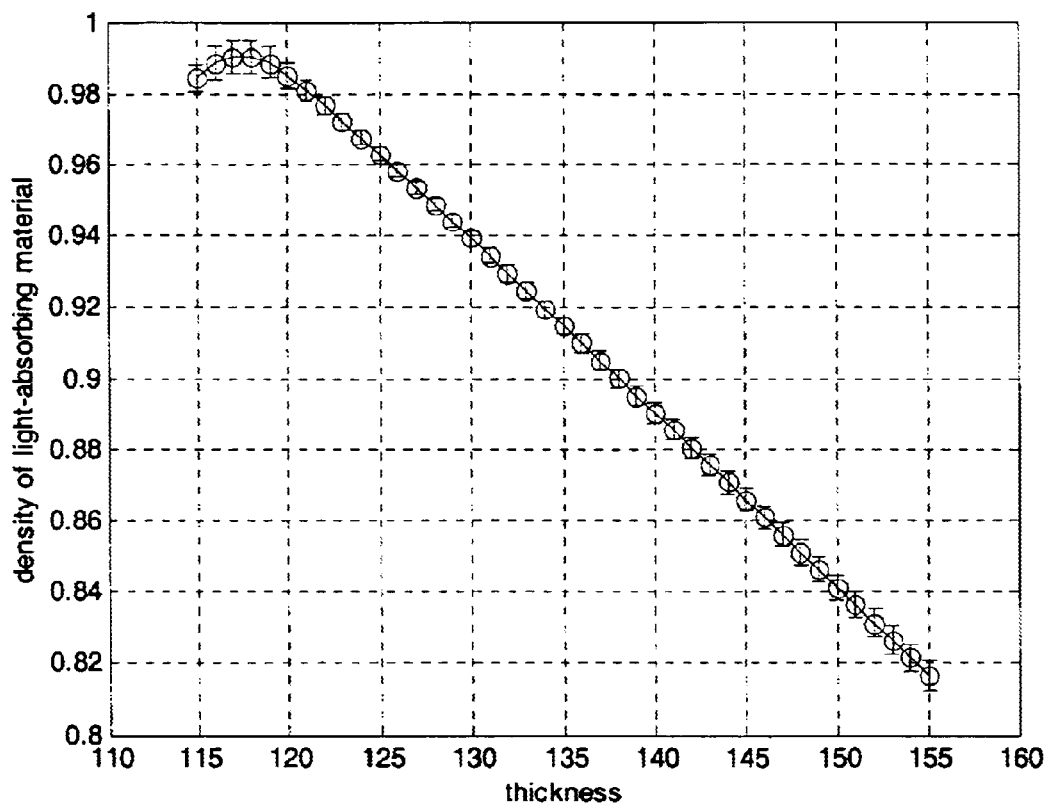
FIG. 32 shows the variation in density of light-absorbing material as a function of substrate thickness for a screen design with target thickness 125 microns and depth of microlens array 30 microns.

FIG. 23 shows the apertures in the light-absorbing material. The density of light-absorbing material is 80% and the total efficiency of the screen is measured at 84%. FIG. 24 shows a different realization with longer exposure in the aperture-creating process. In this case the density of light-absorbing material is 65% and the total screen transmission is 88.5%. Note that, because of the spatial arrangement used in this practical demonstration (see FIG. 22), the maximum theoretical transmission possible through the light-absorbing material is 90%. The present demonstration, in nearly reaching that value, illustrates the high level of efficiency achievable with the invention. It is possible to obtain further improved transmission in the range 90%–95% by employing a close-packed hexagonal array since in this case the maximum theoretical efficiency is 100%, neglecting surface losses.

To complete our description of the present invention, some relevant screen prescriptions are now presented. The thickness of the light-absorbing material is typically on the order of 4 to 8 microns. The results presented here are based on computer simulations for an incident wavelength $\lambda=550$ nm. The computer simulations were performed in accordance with the teachings of U.S. patent application Ser. No. 09/918,408, filed on Jul. 30, 2001 in the names of G. Michael Morris and Tasso R. M. Sales and entitled "STRUCTURED SCREENS FOR CONTROLLED SPREADING OF LIGHT," the relevant portions of which are incorporated herein by reference. The microlens material and substrate were assumed to be polycarbonate. The index of refraction for the exposure of the light-absorbing material equals 1.7 while the index for the maximum wavelength in the image-forming spectrum (700 nm) equals 1.58. The spatial lens arrangement was close-packed hexagonal with a microlens diameter equal to 50 $\mu$m. The microlens sag function is given as $$s(x, y) = \frac{\alpha_x x^2/R_{sx} + \alpha_y y^2/R_{sy}}{1 + \sqrt{1 - x^2/R_{sx}^2 - y^2/R_{sy}^2}} + \frac{x^2}{2R_{px}} + \frac{y^2}{2R_{py}}, \quad (23)$$

where each axis is characterized by a parabolic radius of curvature ($R_p$), a spherical radius of curvature ($R_s$), and two spherical scaling factors ($\alpha_x$ and $\alpha_y$). The lenses are anamorphic, implying that the design parameters along directions x and y are distinct. In all cases the range of variation for the spherical radius of curvature along the fast axis was uniformly distributed between 27 and 32 microns; the spherical scaling for the fast axis varied between 0.7 and 1; the spherical radius of curvature along the slow axis was uniformly distributed between 40 and 60 microns. The remaining parameters were determined according to the methods described above in connection with Eqs. (1) through (21). Also, we assumed that the slow axis is used to form the apertures in the light-absorbing material. It is clear, however, that either the slow or the fast axis can be used in the aperture-forming process. Other expressions for the microlens sag are also possible such as the one shown below $$s(x, y) = \quad (24)$$
$$\alpha_x\left(R_{sx} - \sqrt{R_{sx}^2 - x^2}\right) + \frac{x^2}{2R_{px}} + \alpha_y\left(R_{sy} - \sqrt{R_{sy}^2 - y^2}\right) + \frac{y^2}{2R_{px}},$$

with the possible inclusion of terms with power of 4 and above. The methods of the present invention apply equally to any form of the sag function.

Results are presented in Table II which sets forth the following data: (1) target substrate thickness ($\tau$); (2) total depth of microlens array ($s_{max}$); (3) total divergence at half-maximum along the fast axis ($\Delta\theta_f$); (4) total divergence at half-maximum along the slow axis ($\Delta\theta_s$), (5) gain at 0, 15, 30, and 45 degrees along fast axis ($G^\theta_f$); (6) gain at 0, 15, 30, and 45 degrees along slow axis ($G^\theta_s$). The divergence is measured from the cubic-square-root of the raw intensity as this provides a better model of the eye sensitivity and the gain is calculated with respect to a uniform Lambertian scatterer. Each row refers to a distinct screen configuration with a distinct screen design, according to the invention as described above.

The data in Table II provides performance information regarding viewing angles and relative intensity fall-off. As can be seen in this table, thinner substrates lead to wider angles along the slow axis while deeper microlens arrays lead to wider angles along the fast axis. As indicated by the gain data, the slow axis generally presents a flat scattering profile while the fast axis shows a slower decay, implying acceptable viewing angles over nearly the full 180 degrees.

To complement the data presented in Table II we now look at the density of light-absorbing material responsible for ensuring proper ambient light rejection and image contrast. Plots of the density of light-absorbing material as a function of substrate thickness are shown in FIGS. 25 through 32 for each screen design shown in Table II. Note that in all cases the density of light-absorbing material is above 90% at the target thickness. As the substrate thickness varies so does the density of light-absorbing material. Thinner substrates experience at first an increase in the density of light-absorbing material because it gets closer to the focal point of the aperture-forming wavelength. This situation is undesirable since the small aperture prevents relevant image information associated with long wavelengths in the image-forming spectrum from being transmitted. Thicker substrates experience a decrease in the density of light-absorbing material because the aperture-exposing spot size increases with thickness. The error bars indicated in FIGS. 25 through 32 represent the variation in density as measured by the standard deviation due to the fact that the microlens array is random thus reflecting the variation in spot size due to each lens. Still, because the lenses are generated according to the present invention, the density of light-absorbing material remains high, as desirable. These results are based on a ray-tracing analysis of the microlens array. Due to manufacturing errors the profile of each microlens may differ from the intended design (generally by less than 20%) causing some rays to deviate from the desired focus. As a result, the actual spot size at the light-absorbing material may experience some enlargement. Even if one considers a 10–15% variation in density due to diffraction effects the aperture density still remains above 80–85%, which provides more than adequate ambient-light rejection and contrast.

Figure 33:
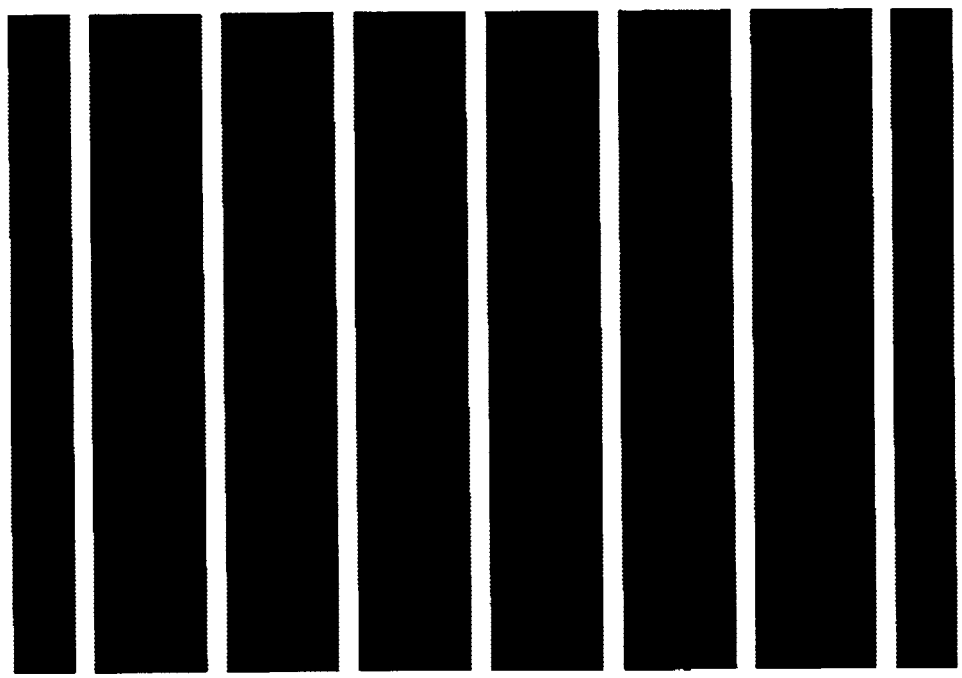
FIG. 33 shows the geometry of apertures in the light-absorbing material according to the prior art.
Figure 33:
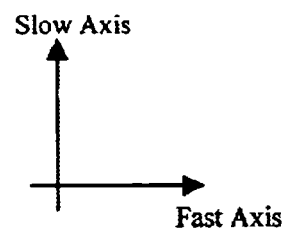
Figure 34:
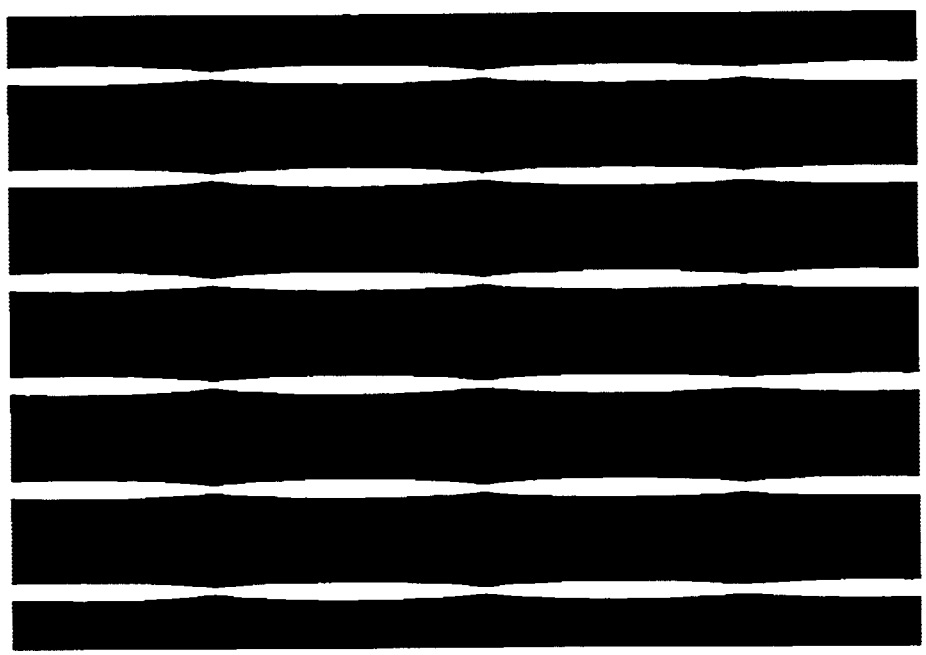
FIG. 34 shows the geometry of apertures in the light-absorbing material according to the present invention in the form of horizontal modulated lines.
Figure 34:
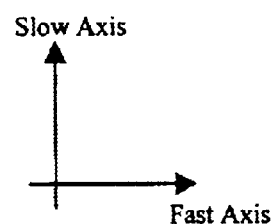
Figure 35:
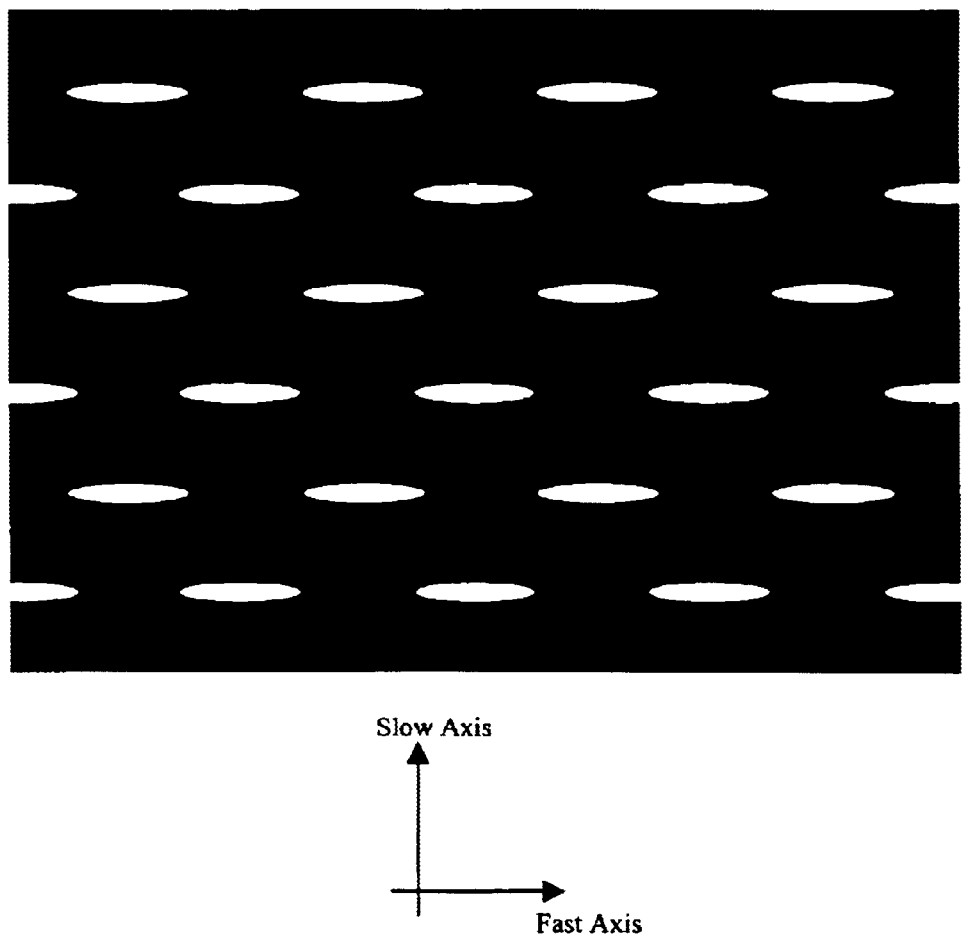
FIG. 35 shows the geometry of apertures in the light-absorbing material according to the present invention in the form of horizontal ovals.
Figure 36:
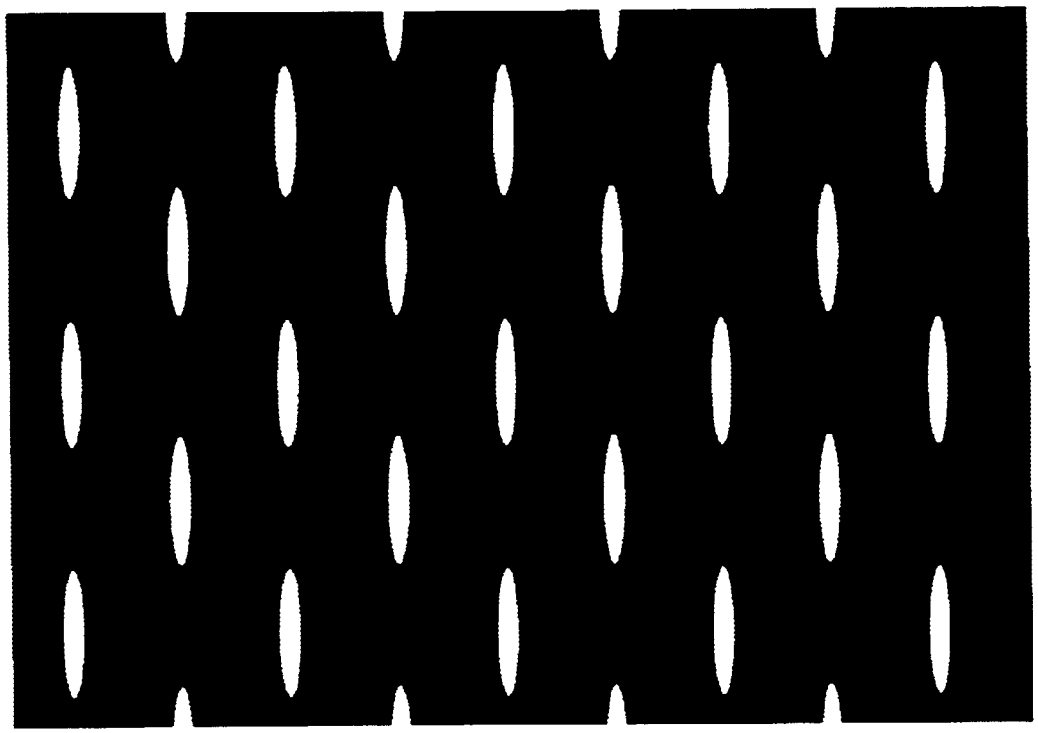
FIG. 36 shows the geometry of apertures in the light-absorbing material according to the present invention in the form of vertical ovals.
Figure 36:
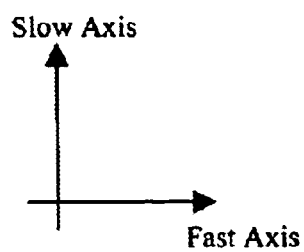
Figure 37:
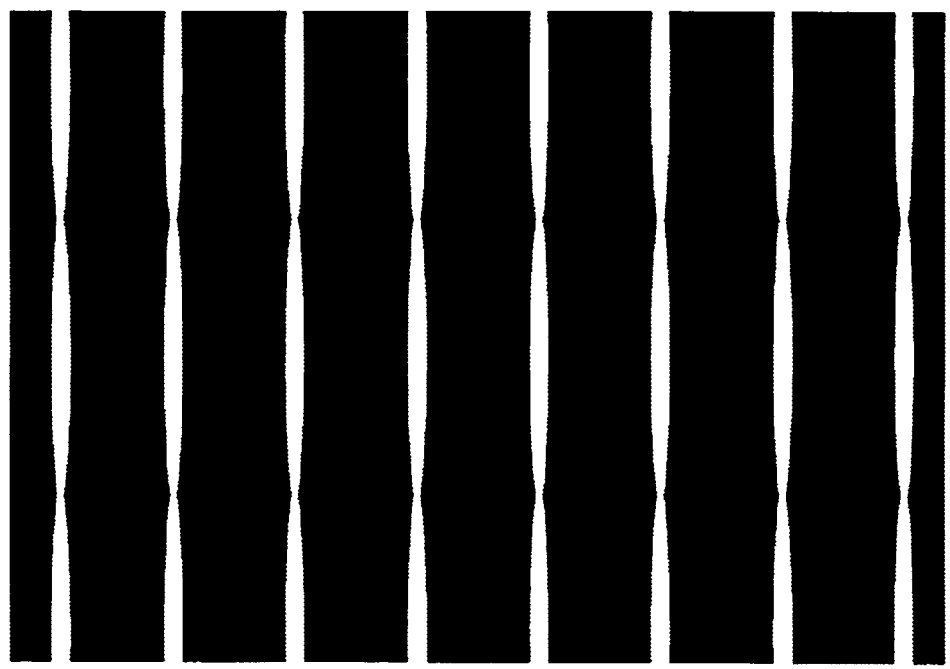
FIG. 37 shows the geometry of apertures in the light-absorbing material according to the present invention in the form of vertical modulated lines.
Figure 37:
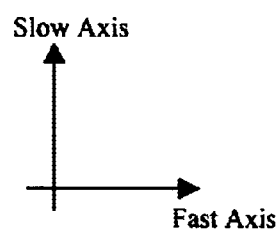
Figure 38:
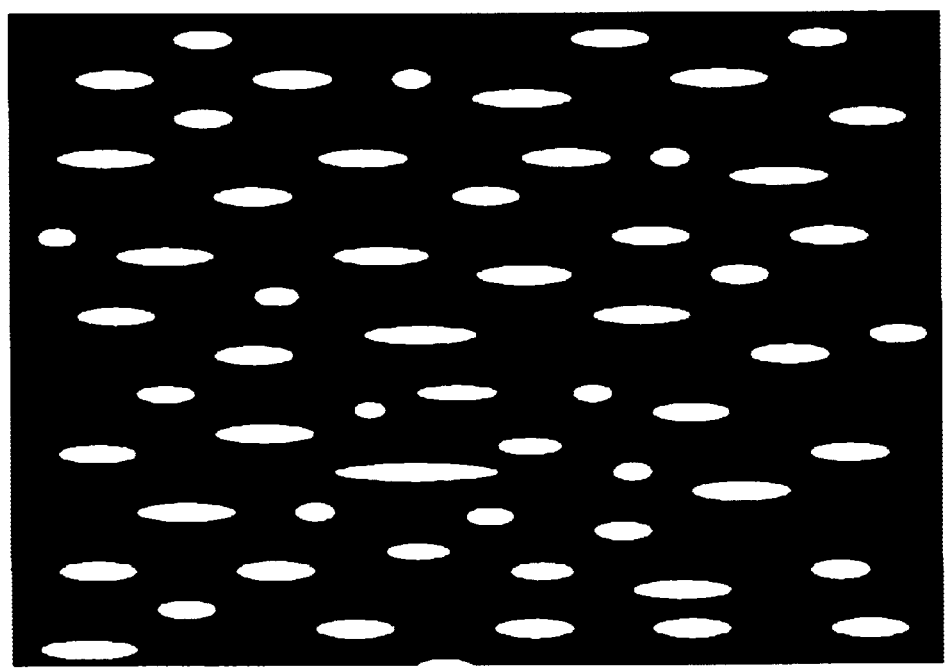
FIG. 38 shows the geometry of apertures in the light-absorbing material according to the present invention in the form of horizontal ovals of variable sizes and locations.
Figure 38:
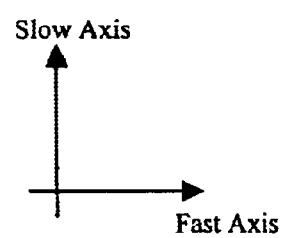
Figure 39:
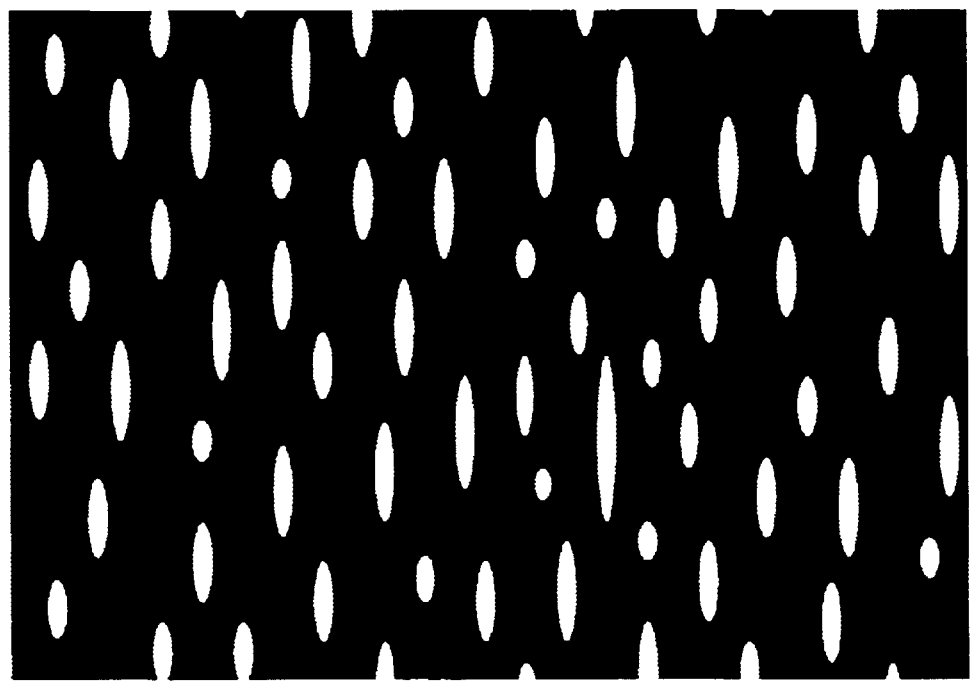
FIG. 39 shows the geometry of apertures in the light-absorbing material according to the present invention in the form of vertical ovals of variable sizes and locations.
Figure 39:
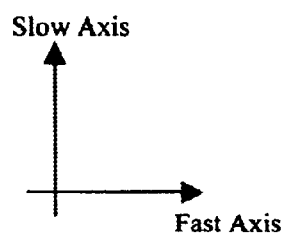

A further feature of the present invention, as opposed to the prior art, is that the final physical aspect of the light-absorbing material may assume a wider variety of appearances, depending on which axis is chosen as fast or slow and/or the shapes of the microlenses. This pattern, while not visible to the viewer, is intrinsically related to the microlens configuration and design, serving as a kind of signature of the invention. In the prior art, one generally finds vertical slits in the light-absorbing material, as illustrated in FIG. 33. As shown in this and all remaining figures, the screen is facing viewer space with fast and slow axis as indicated. According to the present invention, however, there are several other possibilities. For the screen configurations described in Table II, for instance, the apertures resemble horizontal lines, as illustrated in FIG. 34. But depending on the relative strength of the focusing power of each axis of a given microlens other configurations are also possible. FIG. 35 shows the case where the fast axis divergence is not enough to overlap the focal spots at the light-absorbing material. FIG. 36 shows the case where the fast axis is used to form the apertures but the slow axis divergence is not enough to overlap the focal spots at the light-absorbing material. FIG. 37 shows the case where the fast axis is used to form the apertures and the slow axis divergence is enough to overlap the focal spots at the light-absorbing material. This is the case similar to the demonstration shown in FIGS. 23 and 24. FIG. 38 shows the case of an array of microlenses with random locations and random polygonal boundaries where the slow axis is used to form the apertures but the fast axis divergence is not enough to overlap the focal spots at the light-absorbing material. FIG. 39 shows the case of an array of microlenses with random locations and random polygonal boundaries where the fast axis is used to form the apertures but the slow axis divergence is not enough to overlap the focal spots at the light-absorbing material. Variations of these combinations may occur whereby some apertures overlap while others do not.

Although specific embodiments of the invention have been described and illustrated, it will be apparent to those skilled in the art that modifications and variations can be made without departing from the invention's spirit and scope.

TABLE I

| Equation | Paraxial | Non-paraxial |
|---|---|---|
| Eq. (2) | $\tan\theta = \dfrac{D}{2f_0}$ | $\tan\theta = \dfrac{D}{2(f_0 + \Delta f)}$ |
| Eq. (3) | $D(z) = \left\lvert\dfrac{f_0 - z}{f_0}\right\rvert D$ | $D(z) = \left\lvert\dfrac{f_0 + \Delta f - z}{f_0 + \Delta f}\right\rvert D + D_0$ |
| Eq. (5) | $\dfrac{2}{\tau} = \dfrac{1}{f_{exp}} + \dfrac{1}{f_{max}}$ | $\dfrac{2}{\tau} = \dfrac{1}{f_{exp} + \Delta f_{exp}} + \dfrac{1}{f_{max} + \Delta f_{max}}$ |
| Eq. (6) | $\rho(z) = 1 - \left(\dfrac{z - f_{exp}}{f_{exp}}\right)^2$ | $\rho(z) = 1 - \left(\dfrac{z - f_{exp} - \Delta f_{exp}}{f_{exp} + \Delta f_{exp}}\right)^2 + \rho_0$ |

Paraxial (thin-lens approximation) equations and modification for the non-paraxial case (microlenses of finite thickness). The meaning of each parameter is as follows. D: diameter of microlens; $f_0$: paraxial focal length; z: axial distance from the microlens, measured from the point of maximum sag (see FIG. 7); $\tau$: optimum substrate thickness; $f_{exp}$: minimum focal point associated with the aperture-forming spectrum; $f_{max}$: focal length associated with the maximum wavelength in the image-forming spectrum; $\rho$: density of light-absorbing material after apertures have been created; $\Delta f$: variation of focal length due to the finite thickness of microlens ($f_0+\Delta f$ denotes position of circle of least confusion); $D_0$: aperture diameter at the location of the circle of least confusion; $\rho_0$: density of light-absorbing material at the location of the circle of least confusion.

TABLE II

| $\tau$ | $s_{max}$ | $\Delta\theta_f$ | $\Delta\theta_s$ | $G_f^0$ | $G_f^{15}$ | $G_f^{30}$ | $G_f^{45}$ | $G_s^0$ | $G_s^{15}$ | $G_s^{30}$ | $G_s^{45}$ |
|---|---|---|---|---|---|---|---|---|---|---|---|
| 50 | 20 | 82.1 | 82.1 | 4.2 | 3.4 | 1.7 | 0.4 | 4.3 | 3.5 | 2.196 | 0.188 |
| 50 | 30 | 89.3 | 75 | 4 | 3.6 | 2 | 0.7 | 3.9 | 3.1 | 2.264 | 0.028 |
| 75 | 20 | 82.1 | 53.6 | 5.5 | 4.5 | 2.3 | 0.6 | 5.4 | 4.3 | 0.184 | 0.006 |
| 75 | 30 | 96.4 | 46.4 | 5.2 | 4.7 | 2.8 | 1 | 5.1 | 3.7 | 0.092 | 0.015 |
| 100 | 20 | 82.1 | 39.3 | 7 | 5.8 | 3.1 | 0.8 | 7 | 6.4 | 0.028 | 0.006 |
| 100 | 30 | 92.8 | 32.1 | 6.6 | 5.8 | 3.4 | 1.3 | 6.3 | 4.5 | 0.051 | 0.017 |
| 125 | 20 | 82.1 | 32.1 | 8.6 | 7.3 | 3.7 | 1 | 8.3 | 1.6 | 0.022 | 0.006 |
| 125 | 30 | 92.8 | 25 | 8.1 | 7.1 | 4.1 | 1.6 | 7.8 | 0.9 | 0.047 | 0.018 |

Screen performance according to the invention for several cases given substrate thickness, $\tau$, and maximum sag of the anamorphic microlens array, $s_{max}$. Angular divergence $\Delta\theta$ is measured at half-maximum. Gain $G^\theta$ is calculated at angle $\theta$ with respect to a Lambertian scatterer. Subscripts f and s indicate fast and slow axis, respectively.

What is claimed is:

1. A screen for use with image-forming illumination which has a longest image-forming wavelength $\lambda_{long}$, said screen comprising:
   (a) a substrate having first and second opposing surfaces and a target thickness $\tau$;
   (b) an array of lenses associated with the first surface;
   (c) a layer of light-absorbing material associated with the second surface, said layer of light-absorbing material comprising a plurality of apertures formed by a process which comprises passing aperture-forming illumination through the array of lenses, said layer having an overall area and an area that is light blocking;
   wherein $\tau$ has a value such that:
   (i) the apertures do not substantially block light at $\lambda_{long}$; and
   (ii) the ratio $\rho$ of the area that is light blocking to the overall area exceeds 0.5.

2. The screen of claim 1 wherein the array of lenses is an array of randomized lenses.

3. The screen of claim 1 wherein the array of lenses is an array of microlenses.

4. The screen of claim 3 wherein the array of lenses is an array of randomized microlenses.

5. The screen of claim 1 wherein the array of lenses is an array of anamorphic microlenses.

6. The screen of claim 5 wherein the array of lenses is an array of randomized anamorphic microlenses.

7. The screen of claim 5 or 6 wherein: (i) for the aperture-forming illumination, the array of anamorphic microlenses defines an aperture-forming focal plane; and (ii) $\tau$ has a value such that the layer of light-absorbing material substantially lies at said focal plane.

8. The screen of claim 7 wherein the anamorphic microlenses have fast axes and slow axes and the aperture-forming focal plane corresponds to the fast axes.

9. The screen of claim 7 wherein the anamorphic microlenses have fast axes and slow axes and the aperture-forming focal plane corresponds to the slow axes.

10. The screen of claim 5 or 6 wherein the anamorphic microlenses have fast axes and slow axes and unequal diameters along said fast and slow axes.

11. The screen of claim 10 wherein $D_f$ is a fast axis diameter and $D_s$ is a slow axis diameter and $D_f > D_s$.

12. The screen of claim 3, 4, 5, or 6 wherein: (i) the microlenses are characterized by a thin-lens paraxial focal length $f_{exp}$ associated with the aperture-forming illumination and a thin-lens paraxial focal length $f_{max}$ associated with $\lambda_{long}$; and (ii) $\tau$ substantially satisfies the relationship:

$$\frac{2}{\tau} = \frac{1}{f_{exp}} + \frac{1}{f_{max}}.$$

13. The screen of claim 3, 4, 5, or 6 wherein: (i) the microlenses are characterized by a thin-lens paraxial focal length $f_{exp}$ associated with the aperture-forming illumination and a thin-lens paraxial focal length $f_{max}$ associated with $\lambda_{long}$; and (ii) $\tau$ substantially satisfies the relationship:

$$\frac{2}{\tau} = \frac{1}{f_{exp} + \Delta f_{exp}} + \frac{1}{f_{max} + \Delta f_{max}},$$

where $\Delta_{exp}$ and $\Delta f_{max}$ are respectively variations in $f_{exp}$ and $f_{max}$ due to the microlenses having finite thicknesses.

14. The screen of claim 3, 4, 5, or 6 wherein: (i) the microlenses are characterized by a thin-lens paraxial focal length $f_{exp}$ associated with the aperture-forming illumination and a thin-lens paraxial focal length $f_{max}$ associated with $\lambda_{long}$; and (ii) $\tau$ substantially satisfies the relationship:

$$2\frac{f_{exp}f_{max}}{f_{exp}+f_{max}} \leq \tau < f_{exp}\left(1+\frac{1}{\sqrt{2}}\right).$$

15. The screen of claim 14 wherein $\rho$ substantially satisfies the relationship:

$$\frac{1}{2} < \rho \leq \frac{4f_{exp}f_{max}}{(f_{exp}+f_{max})^2}.$$

16. The screen of claim 3, 4, 5, or 6 wherein the array is selected from the group consisting of a close-packed square array, a close-packed rectangular array, a close-packed hexagonal array, a close-packed hexagonal array with microlens units having spherical boundaries, and a random spatial arrangement with microlens units having polygonal boundaries.

17. The screen of claim 3, 4, 5, or 6 wherein the shape of the apertures is selected from the group consisting of horizontally-modulated lines, vertically modulated lines, horizontal ovals, horizontal ovals in a hexagonal spatial arrangement, horizontal ovals in a square spatial arrangement, vertical ovals, vertical ovals in a hexagonal spatial arrangement, vertical ovals in a square spatial arrangement, horizontal ovals of varying sizes, horizontal ovals of varying sizes in a randomized spatial arrangement, vertical ovals of varying sizes, and vertical ovals of varying sizes in a randomized spatial arrangement.

18. The screen of claim 1 or 2 wherein: (i) the lenses are characterized by a thin-lens paraxial focal length $f_{exp}$ associated with the aperture-forming illumination and a thin-lens paraxial focal length $f_{max}$ associated with $\lambda_{long}$; and (ii) $\tau$ substantially satisfies the relationship:

$$\frac{2}{\tau} = \frac{1}{f_{exp}} + \frac{1}{f_{max}}.$$

19. The screen of claim 1 or 2 wherein: (i) the lenses are characterized by a thin-lens paraxial focal length $f_{exp}$ associated with the aperture-forming illumination and a thin-lens paraxial focal length $f_{max}$ associated with $\lambda_{long}$; and (ii) $\tau$ substantially satisfies the relationship:

$$\frac{2}{\tau} = \frac{1}{f_{exp}+\Delta f_{exp}} + \frac{1}{f_{max}+\Delta f_{max}},$$

where $\Delta f_{exp}$ and $\Delta f_{max}$ are respectively variations in $f_{exp}$ and $f_{max}$ due to the lenses having finite thicknesses.

20. The screen of claim 1 or 2 wherein: (i) the lenses are characterized by a thin-lens paraxial focal length $f_{exp}$ associated with the aperture-forming illumination and a thin-lens paraxial focal length $f_{max}$ associated with $\lambda_{long}$; and (ii) $\tau$ substantially satisfies the relationship:

$$2\frac{f_{exp}f_{max}}{f_{exp}+f_{max}} \leq \tau < f_{exp}\left(1+\frac{1}{\sqrt{2}}\right).$$

21. The screen of claim 20 wherein $\rho$ substantially satisfies the relationship:

$$\frac{1}{2} < \rho \leq \frac{4f_{exp}f_{max}}{(f_{exp}+f_{max})^2}.$$

22. The screen of claim 1 wherein in at least one direction (the x-direction), the lenses have a sag s(x) which substantially satisfies the relationship:

$$s(x) = \frac{x^2}{2R_{eq}} + \sum_{k=2}^{\infty} c_{2k}x^{2k},$$

where $R_{eq}$ is an equivalent radius of curvature and the $c_{2k}$'s are coefficients of higher-order terms.

23. The screen of claim 22 wherein $R_{eq}$ and $\tau$ substantially satisfy a relationship of the form:

$$R_{eq} = \left(1 - \frac{1}{2n_{exp}} - \frac{1}{2n_{max}}\right)\tau,$$

where $n_{exp}$ and $n_{max}$ are indices of refraction of the lenses associated with the aperture-forming illumination and with $\lambda_{long}$, respectively.

24. The screen of claim 1 wherein in at least one direction (the x-direction), the lenses have a sag s(x) which substantially satisfies the relationship:

$$s(x) = \alpha\left(R_s - \sqrt{R_s^2 - x^2}\right) + \frac{x^2}{2R_p},$$

where $R_s$ is a spherical radius of curvature, $R_p$ is a parabolic radius of curvature, and $\alpha$ is a scale factor.

25. The screen of claim 24 wherein at least one of $R_s$, $R_p$, and $\alpha$ is randomized.

26. The screen of claim 25 wherein at least one of $R_s$, $R_p$, and $\alpha$ is not randomized and is selected to substantially satisfy a relationship of the form:

$$\frac{R_p R_s}{\alpha R_p + R_s} = \left(1 - \frac{1}{2n_{exp}} - \frac{1}{2n_{max}}\right)\tau,$$

where $n_{exp}$ and $n_{max}$ are indices of refraction of the lenses associated with the aperture-forming illumination and with $\lambda_{long}$, respectively.

27. The screen of claim 1 wherein the lenses have a sag s(x,y) which substantially satisfies the relationship:

$$s(x,y) = \frac{\alpha_x x^2/R_{sx} + \alpha_y y^2/R_{sy}}{1+\sqrt{1-x^2/R_{sx}^2 - y^2/R_{sy}^2}} + \frac{x^2}{2R_{px}} + \frac{y^2}{2R_{py}},$$

where $R_{sx}$ and $R_{sy}$ are spherical radii of curvature, $R_{px}$ and $R_{py}$ are parabolic radii of curvature, and $\alpha_x$ and $\alpha_y$ are scale factors.

28. The screen of claim 27 wherein at least one of $R_{sx}$, $R_{sy}$, $R_{px}$, $R_{py}$, $\alpha_x$, and $\alpha_y$ is randomized.

29. The screen of claim 1 wherein the lenses have a sag s(x,y) which substantially satisfies the relationship:

$$s(x,y) = \alpha_x\left(R_{sx} - \sqrt{R_{sx}^2 - x^2}\right) + \frac{x^2}{2R_{px}} + \alpha_y\left(R_{sy} - \sqrt{R_{sy}^2 - y^2}\right) + \frac{y^2}{2R_{px}},$$

where $R_{sx}$ and $R_{sy}$ are spherical radii of curvature, $R_{px}$ and $R_{py}$ are parabolic radii of curvature, and $\alpha_x$ and $\alpha_y$ are scale factors.

30. The screen of claim 29 wherein at least one of $R_{sx}$, $R_{sy}$, $R_{px}$, $R_{py}$, $\alpha_x$, and $\alpha_y$ is randomized.

31. The screen of claim 1 wherein ρ is at least 0.7.

32. The screen of claim 1 wherein the screen has a transmission efficiency which is greater than 80%.

33. The screen of claim 1 wherein a space exists between at least two of the lenses that is randomly interpolated.

34. The screen of claim 1 wherein the array of lenses is an array of microlenses and wherein the microlenses have different diameters along two perpendicular directions.

35. The screen of claim 1 wherein $\lambda_{long}$ is approximately 700 nm.

36. The screen of claim 1 wherein the array of lenses and the substrate constitute separate components.

37. The screen of claim 1 wherein the array of lenses and the substrate constitute a single unitary component.

38. A screen comprising a layer of light-absorbing material which comprises a plurality of apertures, said apertures having a shape selected from the group consisting of horizontally-modulated lines, vertically modulated lines, horizontal ovals, horizontal ovals in a hexagonal spatial arrangement, horizontal ovals in a square spatial arrangement, vertical ovals, vertical ovals in a hexagonal spatial arrangement, vertical ovals in a square spatial arrangement, horizontal ovals of varying sizes, horizontal ovals of varying sizes in a randomized spatial arrangement, vertical ovals of varying sizes, and vertical ovals of varying sizes in a randomized spatial arrangement.

39. A screen comprising a substrate and an array of lenses associated with the substrate wherein a space exists between at least two of the lenses that is randomly interpolated.

40. A method for producing a screen for use with image-forming illumination, said method comprising:
  (a) providing a substrate having first and second opposing surfaces;
  (b) associating an array of anamorphic microlenses with the first surface;
  (c) associating a layer of a light-absorbing material with the second surface; and
  (d) forming a plurality of apertures in the layer of light-absorbing material by passing aperture-forming illumination through the array of microlenses;
wherein the optical properties of the microlenses and a target thickness for the substrate are selected so as to maximize the light-blocking area of the layer of light-absorbing material while allowing image-forming illumination to pass through the layer's apertures substantially unimpeded.

41. The method of claim 40 wherein the array of anamorphic microlenses is an array of randomized anamorphic microlenses.

42. The method of claim 40 or 41 wherein the anamorphic microlenses have fast axes and slow axes.

43. The method of claim 42 wherein in step (d), the fast axes are used to form the apertures.

44. The method of claim 42 wherein in step (d), the slow axes are used to form the apertures.

45. The method of claim 42 wherein the anamorphic microlenses have unequal diameters along said fast and slow axes.

46. The method of claim 45 wherein $D_f$ is a fast axis diameter and $D_s$ is a slow axis diameter and $D_f > D_s$.

47. A method for producing a screen for use with image-forming illumination which has a longest image-forming wavelength $\lambda_{long}$, said method comprising:
  (a) providing a substrate having first and second opposing surfaces;
  (b) associating an array of lenses with the first surface;
  (c) associating a layer of a light-absorbing material with the second surface; and
  (d) forming a plurality of apertures in the layer of light-absorbing material by passing aperture-forming illumination through the array of lenses;
wherein (i) the lenses are characterized by a thin-lens paraxial focal length $f_{exp}$ associated with the aperture-forming illumination and a thin-lens paraxial focal length $f_{max}$ associated with $\lambda_{long}$; and (ii) the substrate has a target thickness τ which is selected using the relationship:

$$\frac{2}{\tau} = \frac{1}{f_{exp}} + \frac{1}{f_{max}}.$$

48. A method for producing a screen for use with image-forming illumination which has a longest image-forming wavelength $\lambda_{long}$, said method comprising:
  (a) providing a substrate having first and second opposing surfaces;
  (b) associating an array of lenses with the first surface;
  (c) associating a layer of a light-absorbing material with the second surface; and
  (d) forming a plurality of apertures in the layer of light-absorbing material by passing aperture-forming illumination through the array of lenses;
wherein (i) the lenses are characterized by a thin-lens paraxial focal length $f_{exp}$ associated with the aperture-forming illumination and a thin-lens paraxial focal length $f_{max}$ associated with $\lambda_{long}$; and (ii) the substrate has a target thickness τ which is selected using the relationship:

$$\frac{2}{\tau} = \frac{1}{f_{exp} + \Delta f_{exp}} + \frac{1}{f_{max} + \Delta f_{max}},$$

where $\Delta f_{exp}$ and $\Delta f_{max}$ are respectively variations in $f_{exp}$ and $f_{max}$ due to the lenses having finite thicknesses.

49. A method for producing a screen for use with image-forming illumination which has a longest image-forming wavelength $\lambda_{long}$, said method comprising:
  (a) providing a substrate having first and second opposing surfaces;
  (b) associating an array of lenses with the first surface;
  (c) associating a layer of a light-absorbing material with the second surface; and
  (d) forming a plurality of apertures in the layer of light-absorbing material by passing aperture-forming illumination through the array of lenses;
wherein:
  (i) in at least one direction (the x-direction), the lenses have a sag s(x) which substantially satisfies the relationship:

$$s(x) = \frac{x^2}{2R_{eq}} + \sum_{k=2}^{\infty} c_{2k} x^{2k},$$

where $R_{eq}$ is an equivalent radius of curvature and the $c_{2k}$'s are coefficients of higher-order terms; and
  (ii) the substrate has a target thickness τ which is selected using the relationship:

$$R_{eq} = \left(1 - \frac{1}{2n_{exp}} - \frac{1}{2n_{max}}\right)\tau,$$

where $n_{exp}$ and $n_{max}$ are indices of refraction of the lenses associated with the aperture-forming illumination and with $\lambda_{long}$, respectively.

50. A method for producing a screen comprising:
    (a) providing a substrate having first and second opposing surfaces;
    (b) associating an array of lenses with the first surface;
    (c) associating a layer of a light-absorbing material with the second surface; and
    (d) forming a plurality of apertures in the layer of light-absorbing material by passing aperture-forming illumination through the array of lenses;

wherein:
    (i) in at least one direction (the x-direction), the lenses have a sag s(x) which substantially satisfies the relationship:

$$s(x) = \alpha\left(R_s - \sqrt{R_s^2 - x^2}\right) + \frac{x^2}{2R_p},$$

where $R_s$ is a spherical radius of curvature, $R_p$ is a parabolic radius of curvature, and $\alpha$ is a scale factor; and
    (ii) at least one of $R_s$, $R_p$, and $\alpha$ is randomized.

51. The method of claim 50 wherein:
    (i) the screen is for use with image-forming illumination which has a longest image-forming wavelength $\lambda_{long}$; and
    (ii) at least one of $R_s$, $R_p$, and $\alpha$ is not randomized and is selected using a relationship of the form:

$$\frac{R_p R_s}{\alpha R_p + R_s} = \left(1 - \frac{1}{2n_{exp}} - \frac{1}{2n_{max}}\right)\tau,$$

where $\tau$ is a target thickness of the substrate and $n_{exp}$ and $n_{max}$ are indices of refraction of the lenses associated with the aperture-forming illumination and with $\lambda_{long}$, respectively.

52. A method for producing a screen comprising:
    (a) providing a substrate having first and second opposing surfaces;
    (b) associating an array of lenses with the first surface;
    (c) associating a layer of a light-absorbing material with the second surface; and
    (d) forming a plurality of apertures in the layer of light-absorbing material by passing aperture-forming illumination through the array of lenses;

wherein:
    (i) the lenses have a sag s(x,y) which substantially satisfies the relationship:

$$s(x, y) = \frac{\alpha_x x^2 / R_{sx} + \alpha_y y^2 / R_{sy}}{1 + \sqrt{1 - x^2/R_{sx}^2 - y^2/R_{sy}^2}} + \frac{x^2}{2R_{px}} + \frac{y^2}{2R_{py}},$$

where $R_{sx}$ and $R_{sy}$ are spherical radii of curvature, $R_{px}$ and $R_{py}$ are parabolic radii of curvature, and $\alpha_x$ and $\alpha_y$ are scale factors; and
    (ii) at least one of $R_{sx}$, $R_{sy}$, $R_{px}$, $R_{py}$, $\alpha_x$, and $\alpha_y$ is randomized.

53. A method for producing a screen comprising:
    (a) providing a substrate having first and second opposing surfaces;
    (b) associating an array of lenses with the first surface;
    (c) associating a layer of a light-absorbing material with the second surface; and
    (d) forming a plurality of apertures in the layer of light-absorbing material by passing aperture-forming illumination through the array of lenses;

wherein:
    (i) the lenses have a sag s(x,y) which substantially satisfies the relationship:

$$s(x, y) = \alpha_x\left(R_{sx} - \sqrt{R_{sx}^2 - x^2}\right) + \frac{x^2}{2R_{px}} + \alpha_y\left(R_{sy} - \sqrt{R_{sy}^2 - y^2}\right) + \frac{y^2}{2R_{px}},$$

where $R_{sx}$ and $R_{sy}$ are spherical radii of curvature, $R_{px}$ and $R_{py}$ are parabolic radii of curvature, and $\alpha_x$ and $\alpha_y$ are scale factors; and
    (ii) at least one of $R_{sx}$, $R_{sy}$, $R_{px}$, $R_{py}$, $\alpha_x$, and $\alpha_y$ is randomized.

* * * * *

UNITED STATES PATENT AND TRADEMARK OFFICE
CERTIFICATE OF CORRECTION

PATENT NO. : 6,700,702 B2
DATED : March 2, 2004
INVENTOR(S) : Tasso R. M. Sales

It is certified that error appears in the above-identified patent and that said Letters Patent is hereby corrected as shown below:

Title page,
Item [56], References Cited, U.S. PATENT DOCUMENTS, these references should be included.

-- 3,580,661   5/1971   Cooper
   3,830,556   8/1974   Bratkowski
   4,184,762   1/1980   Guzman
   4,531,812   7/1985   Oguino
   5,111,337   5/1992   Martinez
   5,210,641   5/1993   Lewis
   5,694,246   12/1997   Aoyama et al. --

FOREIGN PATENT DOCUMENTS,
-- JP   5-053174   3/1993
   JP   6-016060   6/1994
   JP   11-101902 --

Column 24,
Line 22, currently says, "where $n_{exp\ and\ nmax}$ are indices of refraction of the" should read, -- where $n_{exp}$ and $n_{max}$ are indices of refraction of the --

Signed and Sealed this

Seventeenth Day of May, 2005

JON W. DUDAS
*Director of the United States Patent and Trademark Office*